(12) United States Patent
Yamada

(10) Patent No.: US 6,771,793 B1
(45) Date of Patent: Aug. 3, 2004

(54) IMAGE PROCESSING METHOD AND APPARATUS

(75) Inventor: Masahiko Yamada, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/505,768

(22) Filed: Feb. 17, 2000

(30) Foreign Application Priority Data

Feb. 17, 1999 (JP) ............................................ 11-038688

(51) Int. Cl.$^7$ ............................. G06K 9/40; G06K 9/46
(52) U.S. Cl. ...................... 382/2.64; 382/261; 382/263; 382/240
(58) Field of Search ................................. 382/260, 263, 382/264, 254, 261, 275, 266, 240; 348/606, 609, 625; 358/1.9, 3.26, 3.27; 708/311

(56) References Cited

U.S. PATENT DOCUMENTS

| | | | |
|---|---|---|---|
| 4,258,264 A | 3/1981 | Kotera et al. | ................. 250/484 |
| 5,402,338 A | 3/1995 | Ito | ......................... 364/413.23 |
| 5,461,655 A | 10/1995 | Vuylsteke et al. | ............. 378/62 |
| 5,467,404 A | 11/1995 | Vuylsteke et al. | ........... 382/274 |
| 5,644,662 A | 7/1997 | Vuylsteke | ..................... 382/302 |
| 5,727,078 A | * 3/1998 | Chupeau | ....................... 382/154 |
| 5,805,721 A | 9/1998 | Vuylsteke et al. | ........... 382/128 |
| 6,072,913 A | * 6/2000 | Yamada | ........................ 382/275 |
| 6,292,592 B1 | * 9/2001 | Braunreiter et al. | ......... 382/240 |

FOREIGN PATENT DOCUMENTS

| | | | |
|---|---|---|---|
| JP | 56-11395 | 2/1981 | ............. G21K/4/00 |
| JP | 55-163772 | 12/1987 | ............. H01M/4/73 |
| JP | 5-244508 | 9/1993 | ........... H04N/5/325 |
| JP | 6-96200 | 4/1994 | ........... G06F/15/68 |
| JP | 6-274615 | 9/1994 | ........... G06F/15/68 |
| JP | 6-301766 | 10/1994 | ........... G06F/15/62 |
| JP | 9-212623 | 8/1997 | .............. G06T/1/00 |

OTHER PUBLICATIONS

A rational edge preserving smoother, by Giovanni Ramponi, DEEI–University of Trieste, Italy, IEEE 1995, pp. 151–154.*
Wavelets and Signal Processing, O. Rioul and M. Vetterli, IEEE SP Magazine, pp. 14–38, Oct. 1991.
Zero–Crossings of a Wavelet Transform, S. Mallat, IEEE Trans. on Info. Theory, vol. 37, No. 4, pp. 1019–1033, Jul. 1991.
Fast Filter Transforms for Image Processing, P.J. Burt, Comp. Graph. And Image Proc., vol. 16, pp.20–51, 1981.

(List continued on next page.)

Primary Examiner—Vikkram Bali
(74) Attorney, Agent, or Firm—Sughrue Mion, PLLC

(57) ABSTRACT

Band-limited image signals representing images, each of which is of one of different frequency bands, are formed from an original image signal representing an original image. A pixel vector at each of pixels in each of the band-limited images, which are represented by the band-limited image signals, is calculated. A noise component and an edge component of each of the band-limited images are separated in accordance with the calculated pixel vector. Smoothing processing for the noise component and/or enhancement processing for the edge component is performed on each of the band-limited image signals to obtain a processed band-limited image signal. A processed image signal is then obtained in accordance with the thus obtained processed band-limited image signals. The image processing is thus performed such that noise components contained in the image become imperceptible, and such that a structure pattern contained in the image becomes perceptible.

45 Claims, 13 Drawing Sheets

OTHER PUBLICATIONS

Fast Computation of the Difference of Low Pass Transform, J.L. Growley, R.M. Stern, IEEE Trans. on Pattern Analysis and Machine Intelli., vol. 6, No. 2, Mar. 1984.

A Theory for Multiresolution Signal Decomposition; The Wavelet Represnetion, S.G. Mallat, IEEE Trans. on Pattern Analysis and Machine Intelli., vol. 11, No. 7, Jul. 1989.

Image Compression by Garbor Expansion, T. Ebrahimi, M. Kunt, Optical Eng., vol. 30, No. 7, pp. 873–880, Jul. 1991.

Multiscale Image Contrast Amoplification, P. Vuylsteke, E. Schoeters, SPIE, vol. 2167, Image Processing (1994), pp. 551–560.

* cited by examiner

HIGH

MIDDLE

LOW

| 101 | 71 | 27 |
| --- | --- | --- |
| 67 | 98 | 63 |
| 31 | 58 | 105 |

| 1/3 | 0 | 0 |
| --- | --- | --- |
| 0 | 1/3 | 0 |
| 0 | 0 | 1/3 |

| 1/4 | 1/16 | 0 |
| --- | --- | --- |
| 1/16 | 1/4 | 1/16 |
| 0 | 1/16 | 1/4 |

| 101 | 0 | 0 |
| --- | --- | --- |
| 0 | 101 | 0 |
| 0 | 0 | 101 |

| 141 | 35 | 0 |
| --- | --- | --- |
| 35 | 141 | 35 |
| 0 | 35 | 141 |

FIG.20
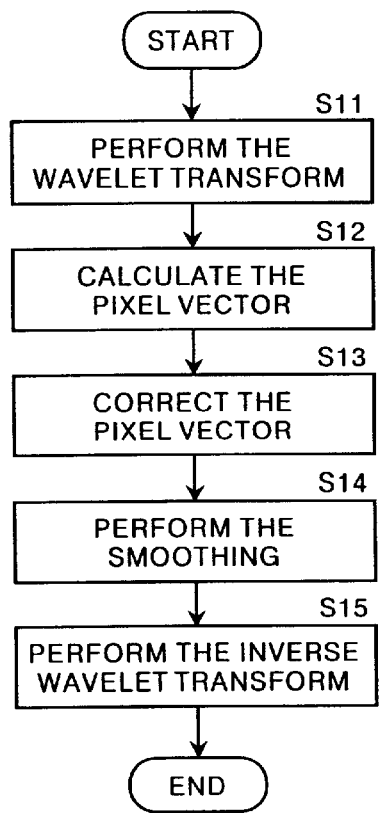
FIG.21A  FIG.21B
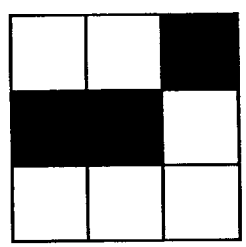 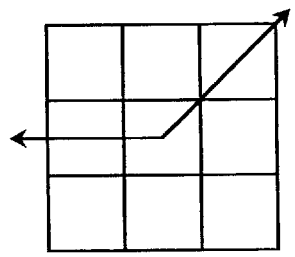

IMAGE PROCESSING METHOD AND APPARATUS

BACKGROUND OF THE INVENTION

1. Field of the Invention

This invention relates to an image processing method and apparatus, wherein processing for suppressing noise and/or processing for enhancing a desired structure pattern is performed on an original image signal representing an original image. This invention also relates to a recording medium, on which a program for causing a computer to execute the image processing method has been recorded and from which the computer is capable of reading the program.

2. Description of the Prior Art

Techniques for obtaining an image signal, which represents an image, carrying out appropriate image processing on the image signal, and then reproducing a visible image by use of the processed image signal have heretofore been known in various fields. For example, in Japanese Unexamined Patent Publication No. 55(1980)-163772, the applicant proposed a method for performing enhancement processing in a frequency domain, such as unsharp masking processing, on an image signal, such that a visible radiation image may be obtained, which has good image quality and can serve as an effective tool in, particularly, the efficient and accurate diagnosis of an illness. With the processing in the frequency domain, an unsharp 1019–1033, July 1991.

The Laplacian pyramid technique has been proposed in, for example, Japanese Unexamined Patent Publication Nos. 5(1993)-244508, 6(1994)-96200, and 6(1994)-301766. With the proposed Laplacian pyramid technique, masking processing is performed on the original image by using a mask having characteristics such that it may be approximately represented by a Gaussian function. A sub-sampling operation is then performed on the resulting image in order to thin out the number of the picture elements to one half along each of two-dimensional directions of the array of the picture elements in the image, and an unsharp image having a size of one-fourth of the size of the original image is thereby obtained. Thereafter, a picture element having a value of 0 is inserted into each of the points on the unsharp image, which were eliminated during the sampling operation, and the image size is thereby restored to the original size. Masking processing is then performed on the thus obtained image by using the aforesaid mask, and an unsharp image is thereby obtained. The thus obtained unsharp image is subtracted from the original image, and a detail image of a predetermined frequency band of the original image is thereby obtained. This processing is iterated with respect to the obtained unsharp image, and N number of unsharp images having sizes of $\frac{1}{2}^{2N}$ of the size of the original image are thereby formed. As described above, the sampling operation is performed on the masking-processed signal is subtracted from an image signal representing an original image, the resulting difference value is multiplied by an enhancement coefficient, and the thus obtained product is added to the image signal. In this manner, predetermined frequency components in the image are enhanced.

Also, as techniques for processing an image signal, techniques referred to as multi-resolution transform techniques have been proposed. With the proposed multi-resolution transform techniques, an image is transformed into multi-resolution images, each of which is of one of a plurality of different frequency bands, and predetermined processing is performed on each of the images of the different frequency bands. Images obtained from the processing are then subjected to inverse multi-resolution transform, and a final processed image is thereby obtained. As the multi-resolution transform techniques, a wavelet transform technique, a Laplacian pyramid technique, and the like, have heretofore been known.

The wavelet transform technique has recently been developed as a frequency analysis method and has heretofore been applied to stereo pattern matching, signal compression, and the like. The wavelet transform technique is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. image, which has been obtained from the masking processing with the mask having the characteristics such that it may be approximately represented by the Gaussian function. Therefore, though the Gaussian filter is used actually, the same processed image as that obtained when a Laplacian filter is used is obtained. Also, in this manner, the images of low frequency bands, which have the sizes of $\frac{1}{2}^{2N}$ of the size of the original image are successively obtained from the image of the original image size. Therefore, the group of the images obtained as a result of the processing is referred to as the Laplacian pyramid.

The Laplacian pyramid technique is described in detail in, for example, "Fast Filter Transforms for Image Processing" by Burt P. J., Computer Graphics and Image Processing, Vol. 16, pp. 20–51, 1981; "Fast Computation of the Difference of Low Pass Transform" by Growley J. L., Stern R. M., IEEE Trans. on Pattern Analysis and Machine Intelligence, Vol. 6, No. 2, March 1984; "A Theory for Multiresolution Signal Decomposition; The Wavelet Representation" by Mallat S. G., IEEE Trans. on Pattern Analysis and Machine Intelligence, Vol. 11, No. 7, July 1989; "Image Compression by Gabor Expansion" by Ebrahimi T., Kunt M., Optical Engineering, Vol. 30, No. 7, pp. 873–880, July 1991; and "Multiscale Image Contrast Amplification" by Pieter Vuylsteke, Emile Schoeters, SPIE, Vol. 2167, Image Processing (1994), pp. 551–560.

In a radiation image, quantum noise of radiation becomes perceptible at an image area, which corresponds to an area exposed to a low dose of radiation and which has a low image density. Therefore, various methods have been proposed, wherein multi-resolution transform is performed on an image signal, which represents a radiation image, with a technique, such as the wavelet transform, band-limited image signals falling within a plurality of different frequency bands are obtained from the multi-resolution transform, and processing for suppressing noise is performed on the band-limited image signals. The methods are disclosed in, for example, Japanese Unexamined Patent Publication Nos. 6(1994)-274615 and 9(1997)-212623.

For example, Japanese Unexamined Patent Publication No. 6(1994)-274615 discloses a method, comprising the steps of:

performing wavelet transform on an image signal by employing a second-order derivative of a smoothing function as a basic wavelet function, band-limited image signals falling within a plurality of different frequency bands being obtained from the wavelet transform, in cases where image processing is performed on each of the band-limited image signals, detecting a point, at which a signal value of a frequency band lower by one stage than a desired frequency band is zero, setting an enhancement coefficient such that an area in the vicinity of the detected zero point takes a value larger than the values of the other areas, enhancing the band-limited image signal of the desired frequency band with the set enhancement coefficient, and performing inverse wavelet transform on the thus processed band-limited image signal and the band-limited image signals, a final processed image signal being thereby obtained. Of a radiation image, major object image information is expressed in a comparatively low frequency band among the plurality of different frequency bands after the wavelet transform, and noise components are expressed in a comparatively high frequency band. Therefore, there is a strong probability that the zero point, at which the image signal of a low frequency band among the image signals falling within the plurality of different frequency bands takes a value of zero, will represent an area associated with an inflection point of the image signal representing the boundary between the major object and the other areas, i.e. an area associated with an edge area of the major object. Also, there is a strong probability that the zero point, at which the image signal of a high frequency band takes a value of zero, will represent an area associated with a noise component. Accordingly, the enhancement coefficient is set such that the value in the vicinity of the zero point of the image signal of a comparatively low frequency band may become large. Also, the image signal of a frequency band higher by one stage than the frequency band, from which the zero point has been detected, is multiplied by the thus set enhancement coefficient. As a result, in the image signal of the frequency band higher by one stage than the frequency band, from which the zero point has been detected, the area corresponding to the edge area of the major object can be enhanced. In this manner, an image signal can be obtained, in which only the area corresponding to the edge of the major object has been enhanced.

Also, Japanese Unexamined Patent Publication No. 9(1997)-212623 discloses a method, comprising the steps of:

performing wavelet transform on an image signal, band-limited image signals falling within a plurality of different frequency bands being obtained from the wavelet transform, processing each of the band-limited image signals such that a signal value smaller than a predetermined threshold value is converted into zero, and performing inverse wavelet transform on the band-limited image signals having been obtained from the processing, a final processed image signal being thereby obtained. With the disclosed method, the signal value corresponding to an area of a comparatively low image density, at which noise is perceptible, becomes zero, and therefore the area of a comparatively low image density, which may be regarded as noise in the image, can be rendered to take a value of zero. In this manner, noise components in the image can be eliminated.

In the method disclosed in Japanese Unexamined Patent Publication No. 6(1994)-274615, enhancement of the desired band-limited image signal is performed in accordance with the signal values of the frequency band lower by one stage than the desired frequency band. However, with the disclosed method, image information representing an object having a fine structure in the desired frequency band is not reflected in the band-limited image signal of the low frequency band, and therefore the fine structure cannot be enhanced. Accordingly, the problems occur in that, in the image represented by the final processed image signal, the image of the object having the fine structure becomes imperceptible.

Also, in the method disclosed in Japanese Unexamined Patent Publication No. 9(1997)-212623, the values of the band-limited image signal smaller than the predetermined value are converted into zero. Therefore, the problems occur in that the signal components, which represent a structure pattern in the image but have signal values smaller than the predetermined value, are regarded as being noise and eliminated from the processed image signal.

SUMMARY OF THE INVENTION

The primary object of the present invention is to provide an image processing method, wherein image processing is capable of being performed such that noise components contained in an image become imperceptible, and such that a structure pattern contained in the image becomes perceptible.

Another object of the present invention is to provide an apparatus for carrying out the image processing method.

The specific object of the present invention is to provide a recording medium, on which a program for causing a computer to execute the image processing method has been recorded and from which the computer is capable of reading the program.

The present invention provides a first image processing method, comprising the steps of:

i) forming band-limited image signals representing images, each of which is of one of a plurality of different frequency bands, from an original image signal representing an original image, ii) calculating a pixel vector at each of pixels in each of the band-limited images, which are represented by the band-limited image signals, iii) separating a noise component and an edge component of each of the band-limited images in accordance with the calculated pixel vector, iv) performing smoothing processing for the noise component and/or enhancement processing for the edge component on each of the band-limited image signals to obtain a processed band-limited image signal, and v) obtaining a processed image signal in accordance with the thus obtained processed band-limited image signals.

In cases where a certain pixel in a band-limited image is taken as a pixel of interest, the pixel vector represents the direction and magnitude of the inclination of the pixel value of the pixel of interest. In order for the pixel vector to be calculated, for example, with respect to each of directions extending from the pixel of interest, the difference between the pixel value of the pixel of interest and the pixel value of a neighboring pixel (or the mean value of the pixel values of a plurality of pixels neighboring with the pixel of interest along a certain direction) may be calculated. The direction, which is associated with the largest difference value or the smallest difference value, may then be determined. The pixel vector may then be calculated from the difference value and the determined direction.

In cases where the direction associated with the largest difference value is taken as the direction of the pixel vector, the pixel vector represents the direction of the signal gradient. In cases where the direction associated with the smallest difference value is taken as the direction of the pixel vector, the pixel vector represents the direction of the equi-signal line.

In cases where the pixel vector is calculated along the direction of the signal gradient, if the difference between the pixel value of the pixel of interest and the pixel value of a neighboring pixel is taken as the magnitude of the pixel vector, a large pixel vector will represent that the pixel, for which the pixel vector has been calculated, is located at an edge component in the image. Also, in such cases, a small pixel vector will represent that the pixel, for which the pixel vector has been calculated, is located at a flat area in the image. Conversely, in cases where the pixel vector is calculated along the direction of the signal gradient, if the reciprocal of the difference between the pixel value of the pixel of interest and the pixel value of a neighboring pixel is taken as the magnitude of the pixel vector, a small pixel vector will represent that the pixel, for which the pixel vector has been calculated, is located at an edge component in the image. Also, in such cases, a large pixel vector will represent that the pixel, for which the pixel vector has been calculated, is located at a flat area in the image.

Further, in cases where the pixel vector is calculated along the direction of the equi-signal line, if the difference between the pixel value of the pixel of interest and the pixel value of a neighboring pixel is taken as the magnitude of the pixel vector, a small pixel vector will represent that the pixel, for which the pixel vector has been calculated, is located at an edge component in the image. Also, in such cases, a large pixel vector will represent that the pixel, for which the pixel vector has been calculated, is located at a flat area in the image. Conversely, in cases where the pixel vector is calculated along the direction of the equi-signal line, if the reciprocal of the difference between the pixel value of the pixel of interest and the pixel value of a neighboring pixel is taken as the magnitude of the pixel vector, a large pixel vector will represent that the pixel, for which the pixel vector has been calculated, is located at an edge component in the image. Also, in such cases, a small pixel vector will represent that the pixel, for which the pixel vector has been calculated, is located at a flat area in the image.

As the direction of the pixel vector, the direction associated with the largest difference value and the direction associated with the second largest difference value may be taken. Alternatively, as the direction of the pixel vector, the direction associated with the smallest difference value and the direction associated with the second smallest difference value may be taken. In such cases, the pixel vector is composed of two vectors.

As described above, in cases where the pixel vector is calculated along the direction of the equi-signal line with respect to a certain pixel of interest, and the reciprocal of the difference described above is taken as the magnitude of the pixel vector, it may be regarded that a large pixel vector represents that the pixel of interest is located at an edge in the image. Also, in such cases, it may be regarded that a small pixel vector represents that the pixel of interest is located at a flat image density area in the image. At the flat area in the image, the pixel of interest may be regarded as being noise.

From the foregoing, it can be found that, in cases where the noise component and the edge component of each of the band-limited images are to be separated in accordance with the calculated pixel vector, a judgment as to whether the pixel is located at the edge or the flat area may be made in accordance with the direction and/or the magnitude of the pixel vector, and the noise component and the edge component may be separated from the band-limited image signal in accordance with the results of the judgment.

The term "smoothing processing for a noise component" as used herein means the processing for setting the pixel value of the pixel corresponding to the noise component at a small value. The term "enhancement processing for an edge component" as used herein means the processing for setting the pixel value of the pixel corresponding to the edge component at a large value.

In the first image processing method in accordance with the present invention, the separation of the noise component and the edge component should preferably be performed in accordance with the pixel vector having been calculated for each pixel and a pixel vector at a pixel neighboring with each pixel.

Also, the first image processing method in accordance with the present invention should preferably be modified such that the pixel vector at a certain pixel in a band-limited image of a certain frequency band is corrected in accordance with the pixel vector at the pixel, which corresponds to the certain pixel, in a band-limited image of a frequency band lower than the certain frequency band (the correction technique will hereinbelow be referred to as the first correction technique), and the separation of the noise component and the edge component is performed in accordance with the corrected pixel vector in lieu of the pixel vector at the certain pixel before being corrected.

The term "correcting a pixel vector" as used herein for the first correction technique means that the direction of the pixel vector at the certain pixel in the band-limited image of the certain frequency band is corrected so as to coincide with the direction of the pixel vector at the pixel, which corresponds to the certain pixel, in the band-limited image of the frequency band lower than the certain frequency band. In cases where the pixel vector is thus corrected, correction may also be made with respect to the pixel vector at the neighboring pixel.

Further, the first image processing method in accordance with the present invention should preferably be modified such that a variance value in a predetermined region containing a certain pixel in a band-limited image of a certain frequency band is calculated, a judgment as to whether the pixel vector at the certain pixel is to be corrected or may not be corrected is made in accordance with the variance value, in cases where it has been judged that the pixel vector at the certain pixel is to be corrected, the pixel vector at the certain pixel is corrected in accordance with the pixel vector at the pixel, which corresponds to the certain pixel, in a band-limited image of a frequency band lower than the certain frequency band (the correction technique will hereinbelow be referred to as the second correction technique), and the separation of the noise component and the edge component is performed in accordance with the corrected pixel vector in lieu of the pixel vector at the certain pixel before being corrected.

The variance value may be the variance value in the predetermined region or the difference value between the value of the pixel of interest, for which the pixel vector has been calculated, and the value of a neighboring pixel. Also, for example, in cases where the pixel vector has been calculated from the pixel of interest and eight neighboring pixels, the difference value described above may be the sum of the differences between the value of the pixel of interest and the values of the eight neighboring pixels, a mean value of the values of the differences, or the like.

As described above, a judgment as to whether the pixel vector at the certain pixel is to be corrected or may not be corrected is made in accordance with the variance value. Specifically, in cases where the variance value in the predetermined region containing the certain pixel is smaller than the variance value in the other region, it is judged that the predetermined region is a flat area, and that the band-limited image of the low frequency band need not be referred to. In cases where the variance value in the predetermined region containing the certain pixel is larger than the variance value in the other region, it is judged that the band-limited image of the low frequency band should be referred to.

The term "correcting a pixel vector" as used herein for the second correction technique means that the direction of the pixel vector at the certain pixel in the band-limited image of the certain frequency band is corrected so as to coincide with the direction of the pixel vector at the pixel, which corresponds to the certain pixel, in the band-limited image of the frequency band lower than the certain frequency band. In cases where the pixel vector is thus corrected, correction may also be made with respect to the pixel vector at the neighboring pixel.

In the first image processing method in accordance with the present invention, as the techniques for forming the band-limited image signals, one of various techniques may be employed. For example, the band-limited image signals may be formed such that they represent the band-limited images of the original image size. By way of example, smoothing may be performed on the original image by utilizing masks of a plurality of different sizes, and a plurality of the band-limited image signals representing the band-limited images of the original image size may thereby be obtained. Also, after the noise component and the edge component in each of the band-limited images have been separated, the smoothing processing for the noise component and/or the enhancement processing for the edge component may be performed on each of the band-limited image signals.

Also, as a technique for forming the band-limited image signals, multi-resolution transform processing may be utilized. Specifically, multi-resolution transform processing may be performed on the original image signal to form the band-limited image signals, and inverse multi-resolution transform processing may be performed on the processed band-limited image signals to obtain the processed image signal. The inverse multi-resolution transform processing is the processing, which corresponds to the multi-resolution transform processing and with which the original signal can be restored (reversibly or irreversibly). In cases where the band-limited image signals are to be formed by performing the multi-resolution transform processing on the original image signal, for example, a technique may be employed, wherein the original image signal is transformed into signals, each of which has frequency response characteristics of one of plurality of different frequency bands, by utilizing Laplacian pyramid decomposition with the Laplacian pyramid technique or by utilizing the wavelet transform technique. In cases where the band-limited image signals have been obtained by utilizing the Laplacian pyramid decomposition, a Laplacian pyramid reconstruction technique is employed as the inverse multi-resolution transform processing. In cases where the band-limited image signals have been obtained by utilizing the wavelet transform technique, inverse wavelet transform processing is employed as the inverse multi-resolution transform processing.

In cases where the multi-resolution transform processing is thus utilized, when the band-limited image signals at the respective resolution levels are compared with one another, the frequency band of the image, which each band-limited image signal can express, becomes low for the image of a resolution lower than a certain resolution level (i.e., for the image of a low pixel density). Therefore, in cases where the multi-resolution transform processing is utilized, the aforesaid term "frequency band lower than a certain frequency band" becomes equivalent to the term "resolution lower than a certain resolution level." Accordingly, for example, in cases where the pixel vector is to be corrected, the direction of the pixel vector at a certain pixel in the image of a certain resolution level may be corrected so as to coincide with the direction of the pixel vector at the pixel, which corresponds to the certain pixel, in the image of the resolution level lower than the certain resolution level.

The present invention also provides a second image processing method, comprising the steps of:

i) forming band-limited image signals representing images, each of which is of one of a plurality of different frequency bands, from an original image signal representing an original image, ii) calculating a pixel vector at each of pixels in each of the band-limited images, which are represented by the band-limited image signals, iii) smoothing each of the band-limited image signals in accordance with a direction of the calculated pixel vector to obtain a smoothed band-limited image signal, and iv) obtaining a processed image signal in accordance with the thus obtained smoothed band-limited image signals.

The second image processing method in accordance with the present invention should preferably be modified such that a neighboring pixel vector at a pixel neighboring with a certain pixel is calculated, and the smoothing is performed in accordance with the direction of the pixel vector at the certain pixel and the direction of the neighboring pixel vector.

The term "smoothing each band-limited image signal in accordance with a direction of a pixel vector" as used herein means that the band-limited image signal is smoothed in accordance with the direction of the pixel vector such that the edge component is kept and noise contained in the edge component (i.e., noise on the edge) is suppressed. For example, in cases where the pixel vector is the vector along the direction of the equi-signal line, the smoothing in accordance with the direction of the pixel vector may be performed by utilizing the pixel of interest, for which the pixel vector has been calculated, a pixel lying in the vector direction, and a pixel lying on the side reverse to the vector direction. Also, for the smoothing, a technique may be employed, where the mean value of the pixel value of the pixel of interest and the pixel value of the pixel lying in the direction of the pixel vector is calculated. Alternatively, a technique for performing the smoothing by utilizing a smoothing filter may be employed.

In order for the processed image signal to be obtained in accordance with the smoothed band-limited image signals, one of various techniques may be employed, wherein the noise components contained in the band-limited image signals before being smoothed are suppressed by the utilization of the smoothed band-limited image signals.

Also, the second image processing method in accordance with the present invention should preferably be modified such that the pixel vector is corrected by the utilization of the first or second correction technique described above, and the smoothing is performed in accordance with the direction of the corrected pixel vector.

Further, the second image processing method in accordance with the present invention should preferably be modified such that a noise component and an edge component of each of smoothed band-limited images, which are represented by the smoothed band-limited image signals, are separated in accordance with a magnitude of the pixel vector, smoothing processing for the noise component and/or enhancement processing for the edge component is performed on each of the smoothed band-limited image signals to obtain a processed band-limited image signal, and the processed image signal is obtained in accordance with the thus obtained processed band-limited image signals in lieu of the smoothed band-limited image signals.

In such cases, the second image processing method in accordance with the present invention should preferably be modified such that a neighboring pixel vector at a pixel neighboring with a certain pixel is calculated, and the separation of the noise component and the edge component is performed in accordance with the magnitude of the pixel vector at the certain pixel and the magnitude of the neighboring pixel vector.

As in the first image processing method in accordance with the present invention, the smoothing processing for the noise component is the processing for setting the pixel value of the pixel corresponding to the noise component at a small value. Also, the enhancement processing for the edge component is the processing for setting the pixel value of the pixel corresponding to the edge component at a large value.

Also, in such cases, the second image processing method in accordance with the present invention should preferably be modified such that the pixel vector is corrected by the utilization of the first or second correction technique described above, and the separation of the noise component and the edge component is performed in accordance with the magnitude of the corrected pixel vector.

In the second image processing method in accordance with the present invention, as in the first image processing method in accordance with the present invention, as the technique for forming the band-limited image signals, one of various techniques may be employed. For example, multi-resolution transform processing may be performed on the original image signal to form the band-limited image signals, predetermined processing may then be performed, and inverse multi-resolution transform processing may be performed on the smoothed band-limited image signals to obtain the processed image signal. Alternatively, in cases where the noise component and the edge component of each of the smoothed band-limited image signals are separated, inverse multi-resolution transform processing may be performed on the processed band-limited image signals to obtain the processed image signal.

The present invention further provides an apparatus for carrying out the first image processing method in accordance with the present invention. Specifically, the present invention further provides a first image processing apparatus, comprising:

i) band-limited image signal forming means for forming band-limited image signals representing images, each of which is of one of a plurality of different frequency bands, from an original image signal representing an original image, ii) pixel vector calculating means for calculating a pixel vector at each of pixels in each of the band-limited images, which are represented by the band-limited image signals, iii) separation means for separating a noise component and an edge component of each of the band-limited images in accordance with the calculated pixel vector, iv) processing means for performing smoothing processing for the noise component and/or enhancement processing for the edge component on each of the band-limited image signals to obtain a processed band-limited image signal, and v) image signal generating means for obtaining a processed image signal in accordance with the thus obtained processed band-limited image signals.

In the first image processing apparatus in accordance with the present invention, the separation means should preferably perform the separation of the noise component and the edge component in accordance with the pixel vector having been calculated for each pixel and a pixel vector at a pixel neighboring with each pixel.

Also, the first image processing apparatus in accordance with the present invention should preferably be modified such that the apparatus further comprises correction means for correcting the pixel vector at a certain pixel in a band-limited image of a certain frequency band in accordance with the pixel vector at the pixel, which corresponds to the certain pixel, in a band-limited image of a frequency band lower than the certain frequency band, and the separation means separates the noise component and the edge component in accordance with the corrected pixel vector in lieu of the pixel vector at the certain pixel before being corrected.

Further, the first image processing apparatus in accordance with the present invention should preferably be modified such that the apparatus further comprises:

a) variance value calculating means for calculating a variance value in a predetermined region containing a certain pixel in a band-limited image of a certain frequency band, b) judgment means for making a judgment as to whether the pixel vector at the certain pixel is to be corrected or may not be corrected, the judgment being made in accordance with the variance value, and c) correction means for operating such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the separation means separates the noise component and the edge component in accordance with the corrected pixel vector in lieu of the pixel vector at the certain pixel before being corrected.

Furthermore, the first image processing apparatus in accordance with the present invention may be modified such that the band-limited image signal forming means is provided with multi-resolution transform processing means for performing multi-resolution transform processing on the original image signal to form the band-limited image signals, and the image signal generating means is provided with inverse multi-resolution transform processing means for performing inverse multi-resolution transform processing on the processed band-limited image signals to obtain the processed image signal.

The present invention still further provides an apparatus for carrying out the second image processing method in accordance with the present invention. Specifically, the present invention still further provides a second image processing apparatus, comprising:

i) band-limited image signal forming means for forming band-limited image signals representing images, each of which is of one of a plurality of different frequency bands, from an original image signal representing an original image, ii) pixel vector calculating means for calculating a pixel vector at each of pixels in each of the band-limited images, which are represented by the band-limited image signals, iii) smoothing means for smoothing each of the band-limited image signals in accordance with a direction of the calculated pixel vector to obtain a smoothed band-limited image signal, and iv) image signal generating means for obtaining a processed image signal in accordance with the thus obtained smoothed band-limited image signals.

The second image processing apparatus in accordance with the present invention should preferably be modified such that the smoothing means calculates a neighboring pixel vector at a pixel neighboring with a certain pixel and performs the smoothing in accordance with the direction of the pixel vector at the certain pixel and the direction of the neighboring pixel vector.

Also, the second image processing apparatus in accordance with the present invention should preferably be modified such that the apparatus further comprises correction means for correcting the pixel vector at a certain pixel in a band-limited image of a certain frequency band in accordance with the pixel vector at the pixel, which corresponds to the certain pixel, in a band-limited image of a frequency band lower than the certain frequency band, and the smoothing means performs the smoothing in accordance with the direction of the corrected pixel vector in lieu of the direction of the pixel vector at the certain pixel before being corrected.

Further, the second image processing apparatus in accordance with the present invention should preferably be modified such that the apparatus further comprises:

a) variance value calculating means for calculating a variance value in a predetermined region containing a certain pixel in a band-limited image of a certain frequency band, b) judgment means for making a judgment as to whether the pixel vector at the certain pixel is to be corrected or may not be corrected, the judgment being made in accordance with the variance value, and c) correction means for operating such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the smoothing means performs the smoothing in accordance with the direction of the corrected pixel vector in lieu of the direction of the pixel vector at the certain pixel before being corrected.

Furthermore, the second image processing apparatus in accordance with the present invention should preferably be modified such that the apparatus further comprises:

separation means for separating a noise component and an edge component of each of smoothed band-limited images, which are represented by the smoothed band-limited image signals, in accordance with a magnitude of the pixel vector, and processing means for performing smoothing processing for the noise component and/or enhancement processing for the edge component on each of the smoothed band-limited image signals to obtain a processed band-limited image signal, and the image signal generating means obtains the processed image signal in accordance with the thus obtained processed band-limited image signals in lieu of the smoothed band-limited image signals.

In such cases, the second image processing apparatus in accordance with the present invention should preferably be modified such that the separation means separates the noise component and the edge component in accordance with the magnitude of the pixel vector at a certain pixel and the magnitude of a neighboring pixel vector at a pixel neighboring with the certain pixel.

Also, the second image processing apparatus in accordance with the present invention should preferably be modified such that the apparatus further comprises correction means for correcting the pixel vector at a certain pixel in a band-limited image of a certain frequency band in accordance with the pixel vector at the pixel, which corresponds to the certain pixel, in a band-limited image of a frequency band lower than the certain frequency band, and the separation means separates the noise component and the edge component in accordance with the magnitude of the corrected pixel vector in lieu of the magnitude of the pixel vector at the certain pixel before being corrected.

Further, the second image processing apparatus in accordance with the present invention should preferably be modified such that the apparatus further comprises:

a) variance value calculating means for calculating a variance value in a predetermined region containing a certain pixel in a band-limited image of a certain frequency band, b) judgment means for making a judgment as to whether the pixel vector at the certain pixel is to be corrected or may not be corrected, the judgment being made in accordance with the variance value, and c) correction means for operating such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the separation means separates the noise component and the edge component in accordance with the magnitude of the corrected pixel vector in lieu of the magnitude of the pixel vector at the certain pixel before being corrected.

Furthermore, the second image processing apparatus in accordance with the present invention may be modified such that the band-limited image signal forming means is provided with multi-resolution transform processing means for performing multi-resolution transform processing on the original image signal to form the band-limited image signals, and the image signal generating means is provided with inverse multi-resolution transform processing means for performing inverse multi-resolution transform processing on the smoothed band-limited image signals to obtain the processed image signal.

Alternatively, the second image processing apparatus in accordance with the present invention, wherein the noise component and the edge component of each of the smoothed band-limited image signals are separated, may be modified such that the band-limited image signal forming means is provided with multi-resolution transform processing means for performing multi-resolution transform processing on the original image signal to form the band-limited image signals, and the image signal generating means is provided with inverse multi-resolution transform processing means for performing inverse multi-resolution transform processing on the processed band-limited image signals to obtain the processed image signal.

The present invention also provides a recording medium, on which a program for causing a computer to execute the first, second, or third image processing method in accordance with the present invention has been recorded and from which the computer is capable of reading the program.

With the first image processing method and apparatus in accordance with the present invention, the pixel vector at each of pixels in each of the band-limited images is calculated. Also, the noise component and the edge component of each of the band-limited images are separated in accordance with the calculated pixel vector.

As described above, the magnitude of the pixel vector varies in accordance with whether the pixel vector is calculated along the direction of the equi-signal line or along the direction of the signal gradient, and whether the pixel vector is calculated as the value of the difference between the pixel value of the pixel of interest and the pixel value of the neighboring pixel or as the reciprocal of the difference. For example, the pixel vector may be calculated along the direction of the equi-signal line, and the reciprocal of the difference between the pixel value of the pixel of interest and the pixel value of the neighboring pixel may be taken as the magnitude of the pixel vector. In such cases, the pixel vector is large at the edge area in the image and is small at the flat area in the image. Therefore, the noise component and the edge component of each of the band-limited images can be separated in accordance with the magnitude of the pixel vector. Further, the smoothing processing for reducing the pixel value of the pixel corresponding to the separated noise component and/or the enhancement processing for enhancing the pixel value corresponding to the separated edge component is performed on each of the band-limited image signals to obtain the processed band-limited image signal. As a result, in each band-limited image, the noise component becomes imperceptible, and the edge component becomes perceptible. Accordingly, in the processed image signal obtained by performing the inverse multi-resolution transform processing on the thus obtained processed band-limited image signals, the edge component becomes perceptible, and the noise component becomes imperceptible. As a result, an image having good image quality can be reproduced from the processed image signal.

In cases where the pixel vector is calculated along the direction of the equi-signal line, and the reciprocal of the difference between the pixel value of the pixel of interest and the pixel value of the neighboring pixel is taken as the magnitude of the pixel vector, if the value of the pixel vector is comparatively small, it may be regarded that the pixel, for which the pixel vector has been calculated, is located at the flat area in the image, i.e. is located at the noise component in the image. However, in such cases, there is a probability that the pixel, for which the pixel vector has been calculated, will be located at a fine edge in the image. In cases where the pixel, for which the pixel vector has been calculated, is located at an edge in the image, the pixel vectors at the neighboring pixels are directed in the same direction. In cases where the pixel, for which the pixel vector has been calculated, is noise in the image, the pixel vectors at the neighboring pixels are directed in random directions. Therefore, with the first image processing method and apparatus in accordance with the present invention, wherein the separation of the noise component and the edge component is performed in accordance with the pixel vector having been calculated for each pixel and pixel vectors at pixels neighboring with each pixel, the probability that a certain pixel will represent an edge or noise can be enhanced. Accordingly, the noise component and the edge component can be separated more accurately.

Also, a comparatively large edge component contained in the original image remains in the image of a low frequency band, and a noise component contained in the original image becomes small in the image of the low frequency band. Therefore, the direction of the pixel vector at a certain pixel in a band-limited image of a certain frequency band should preferably be corrected so as to coincide with the direction of the pixel vector at the pixel, which corresponds to the certain pixel, in the band-limited image of a frequency band lower than the certain frequency band. In such cases, if the certain pixel is located at the edge component, the corrected pixel vector will represent the edge component more accurately. In the image of the low frequency band, a fine noise component becomes smaller than in the image of the high frequency band. Therefore, in cases where the certain pixel is located at the noise component, in the image of the low frequency band, the pixel vector is directed in a random direction, and the magnitude of the pixel vector becomes small. In such cases, the corrected pixel vector represents the flat area, i.e. represents the noise component, more accurately. Accordingly, with the first image processing method and apparatus in accordance with the present invention, wherein the pixel vector at the certain pixel in the band-limited image of the certain frequency band is corrected in accordance with the pixel vector at the pixel, which corresponds to the certain pixel, in the band-limited image of the frequency band lower than the certain frequency band, the probability that the certain pixel will represent the edge or noise can be enhanced, and the separation of the noise component and the edge component can be performed more accurately.

Further, in the image of a comparatively high frequency band, such as the image of a comparatively high resolution level obtained in cases where the multi-resolution transform processing is performed on the original image signal representing the original image, detail edge information is expressed. In the image of a middle frequency band, edge information of the middle frequency band is expressed. Also, in the image of a low frequency band, large edge information of the low frequency band is expressed. Ordinarily, the images of the respective frequency bands have the characteristics such that, as the frequency band becomes high, energy which the image of the high frequency band has becomes low, and such that energy of noise does not depend upon the frequency band. Therefore, as the frequency band becomes low, the image has a high signal-to-noise ratio. As for an area in the original image containing no noise (shown in FIG. 8A), a signal occurs only at an edge area in every band-limited image (as shown in FIGS. 8B, 8C, and 8D). Therefore, in cases where the variance value of pixel values in a predetermined region containing the pixel of interest, for which the pixel vector has been calculated, in the image of a comparatively high frequency band is small, even if the pixel vector at the corresponding pixel in the image of a low frequency band is not referred to, it can be regarded that the pixel of interest, for which the pixel vector has been calculated, is located at a flat area in the image.

As for an area in the original image containing noise (shown in FIG. 9A), in the image of the high frequency band (shown in FIG. 9B), the directions of the pixel vectors are disturbed by the effects of noise, and the variance value becomes large. However, as the frequency band becomes low (as shown in FIGS. 9C and 9D), the effects of noise upon the signal become small, and the variance value becomes small. Therefore, in cases where the variance value of pixel values in a predetermined region containing the pixel, for which the pixel vector has been calculated, in a certain band-limited image is large, if the pixel vector at the corresponding pixel in the image of a low frequency band is not referred to, it cannot be found whether the pixel, for which the pixel vector has been calculated, is located at a flat area or at an edge area in the image. Accordingly, in cases where the variance value described above is large in a certain band-limited image, the pixel vector at the pixel in the certain band-limited image should preferably be corrected by referring to the image of a low frequency band and causing the pixel vector to coincide with the pixel vector of the corresponding pixel in the image of the low frequency band. As a result, the pixel vector can be corrected such that the pixel vector at the flat area represents the flat area more accurately, and such that the pixel vector at the edge area represents the edge area more accurately. Therefore, in accordance with the corrected pixel vector, the noise component and the edge component can be separated accurately.

With the second image processing method and apparatus in accordance with the present invention, as in the first image processing method and apparatus in accordance with the present invention, the pixel vector at each of pixels in each of the band-limited images is calculated. Also, with the second image processing method and apparatus in accordance with the present invention, each of the band-limited images is smoothed in accordance with the direction of the calculated pixel vector.

In cases where noise is mixed in the original image, noise is also contained in the edge component in the image. However, with the second image processing method and apparatus in accordance with the present invention, each of the band-limited image signals is smoothed in accordance with the direction of the calculated pixel vector or the direction of the corrected pixel vector, which has been obtained with the first or second correction technique described above, and the smoothed band-limited image signal is thereby obtained. Also, the processed image signal is obtained in accordance with the thus obtained smoothed band-limited image signals. Therefore, noise on the edge can be suppressed such that the edge component may not be lost. Also, noise in the flat area other than the edge can be suppressed. Accordingly, ultimately, noise on the edge becomes imperceptible, and noise in the flat area becomes imperceptible.

Further, with the second image processing method and apparatus in accordance with the present invention, wherein, after the smoothing, the noise component and the edge component of each of smoothed band-limited images, which are represented by the smoothed band-limited image signals, are separated in accordance with the magnitude of the pixel vector, and the smoothing processing for the noise component and/or the enhancement processing for the edge component is performed on each of the smoothed band-limited image signals to obtain the processed band-limited image signal, the edge enhancement can be performed such that noise on the edge may not become perceptible. Also, noise in the flat area can be suppressed even further. Therefore, an image having image quality enhanced even further can be reproduced.

BRIEF DESCRIPTION OF THE DRAWINGS

FIG. 20 is a flow chart showing how the third embodiment of the image processing apparatus in accordance with the present invention operates, and FIGS. 21A and 21B are explanatory views showing a further different example of how smoothing is performed.

DESCRIPTION OF THE PREFERRED EMBODIMENTS

The present invention will hereinbelow be described in further detail with reference to the accompanying drawings.

Figure 1:
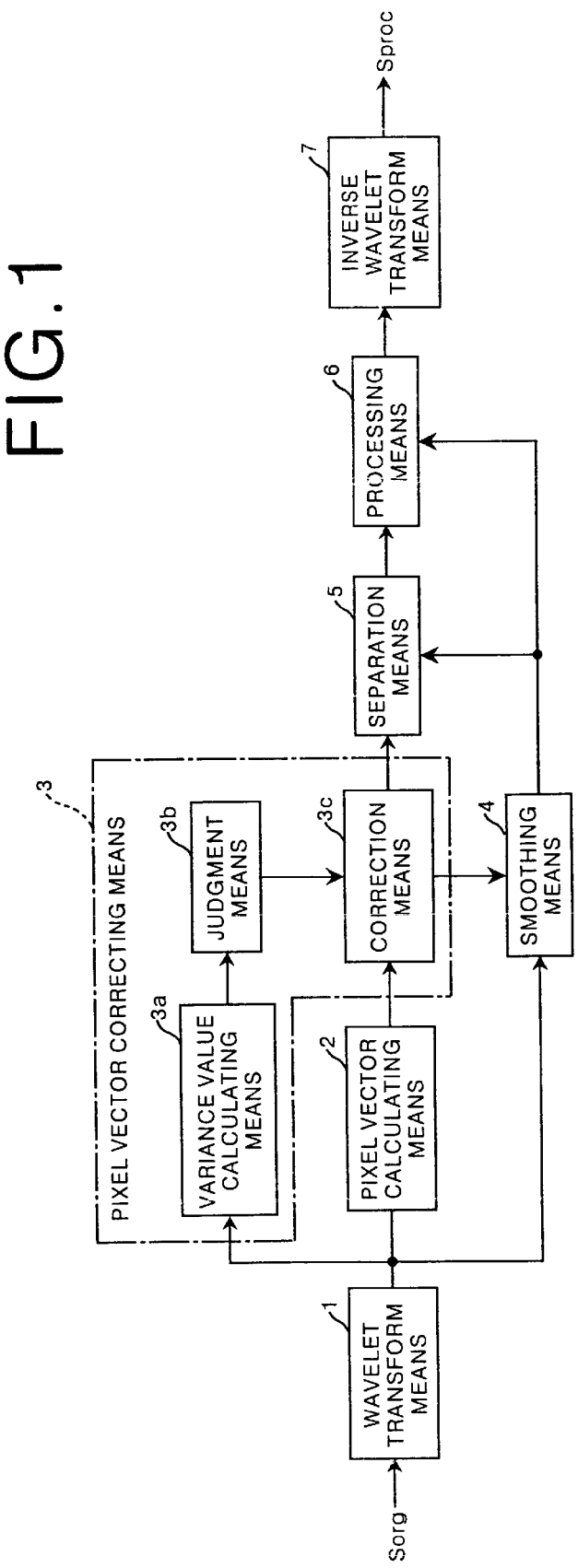
FIG. 1 is a block diagram showing a first embodiment of the image processing apparatus in accordance with the present invention.

FIG. 1 is a block diagram showing a first embodiment of the image processing apparatus in accordance with the present invention. With reference to FIG. 1, the first embodiment of the image processing apparatus in accordance with the present invention comprises wavelet transform means 1 for performing wavelet transform on an original image signal Sorg, which represents a radiation image, to obtain a plurality of wavelet transform factor signals. The image processing apparatus also comprises pixel vector calculating means 2 for calculating a pixel vector from each of the wavelet transform factor signals, which have been obtained from the wavelet transform means 1, in the manner described later. The image processing apparatus further comprises pixel vector correcting means 3 for correcting the pixel vector having been calculated by the pixel vector calculating means 2. The image processing apparatus still further comprises smoothing means 4 for smoothing the wavelet transform factor signal in accordance with the corrected pixel vector, which has been obtained from the pixel vector correcting means 3, and obtaining a smoothed signal. The image processing apparatus also comprises separation means 5 for separating a noise component and an edge component from the smoothed signal and in accordance with the corrected pixel vector. The image processing apparatus further comprises processing means 6 for performing processing, wherein the edge area is enhanced and the noise area is smoothed, on the smoothed signal and in accordance with the results of separation performed by the separation means 5. The image processing apparatus still further comprises inverse wavelet transform means 7 for performing inverse wavelet transform processing on the smoothed signals, which have been processed by the processing means 6, and obtaining a processed image signal Sproc.

Figure 2:
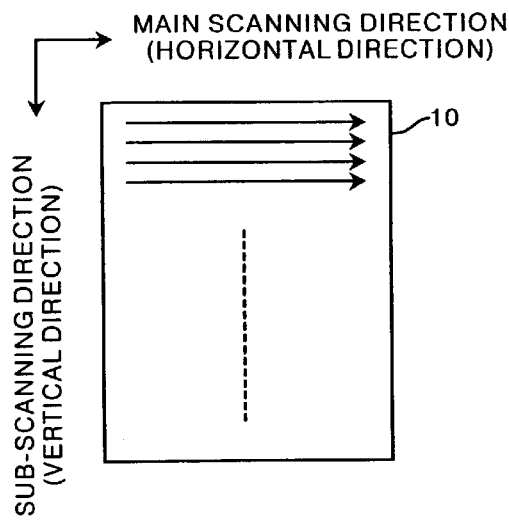
FIG. 2 is an explanatory view showing how an original image signal is detected.

This embodiment is applied to an original image signal obtained in a radiation image recording and reproducing system, which utilizes a stimulable phosphor sheet and which is described in, for example, U.S. Pat. No. 4,258,264 and Japanese Unexamined Patent Publication No. 56(1981)-11395. The original image signal is detected as a digital image signal by scanning a stimulable phosphor sheet, on which a radiation image of a human body has been stored, with a laser beam. As illustrated in FIG. 2, when the operation for reading out the radiation image is performed, a stimulable phosphor sheet 10, on which the radiation image has been stored, is scanned with a laser beam in a main scanning direction (i.e., in the transverse direction). Also, the stimulable phosphor sheet 10 is moved in a sub-scanning direction (i.e., in the longitudinal direction). In this manner, the stimulable phosphor sheet 10 is scanned in two directions with the laser beam.

Figure 3:
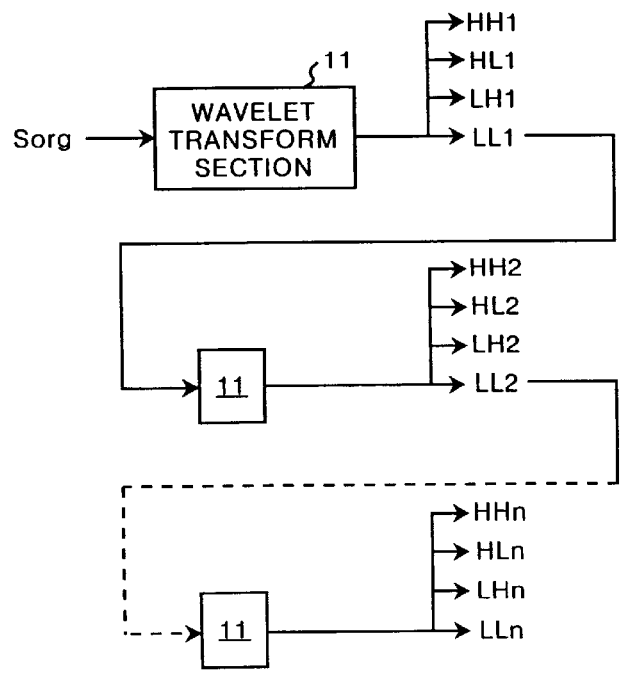
FIG. 3 is a block diagram showing wavelet transform means.

FIG. 3 is a block diagram showing the wavelet transform means 1. In this embodiment, orthogonal wavelet transform, in which the respective wavelet transform factors are orthogonal, is performed. The wavelet transform means 1 acts as the band-limited image signal forming means of the image processing apparatus in accordance with the present invention. Also, the inverse wavelet transform means 7 acts as the image signal generating means of the image processing apparatus in accordance with the present invention.

Figure 4:
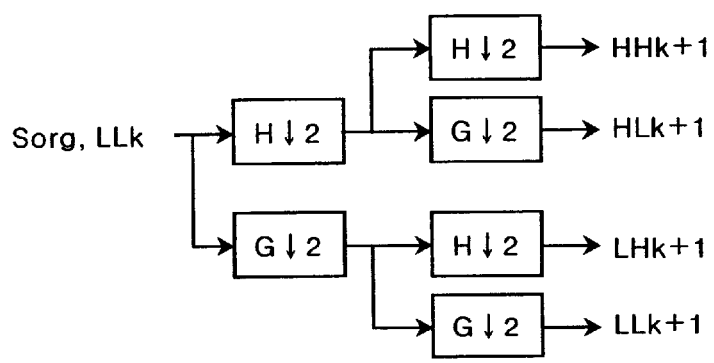
FIG. 4 is an explanatory view showing how processing is performed in a wavelet transform section.

As illustrated in FIG. 3, in a wavelet transform section 11, the wavelet transform is performed on the original image signal Sorg. FIG. 4 is an explanatory view showing how the processing is performed in the wavelet transform section 11. As illustrated in FIG. 4, filtering processing is performed on the original image signal Sorg (or a signal LLk, which will be described later) along the main scanning direction by utilizing each of basic wavelet functions H and G. Also, the signal components representing the pixels located along the main scanning direction are thinned out at intervals of a single pixel (the thinning-out is represented by "↓2"). In this manner, the number of the pixels located along the main scanning direction is reduced to ½. The function H represents a high pass filter, and the function G represents a low pass filter. Thereafter, for each of the thinned-out signals having thus been obtained, filtering processing is performed along the sub-scanning direction by utilizing each of the functions H and G. Also, the signal components representing the pixels located along the sub-scanning direction are thinned out at intervals of a single pixel. In this manner, the number of the pixels located along the sub-scanning direction is reduced to ½. As a result, wavelet transform factor signals (hereinbelow often referred to simply as the signals) HHk+1, HLk+1, LHk+1, and LLk+1 shown in FIG. 4 (in this case, HH1, HL1, LH1, and LL1 shown in FIG. 3) are obtained. The signal LL1 represents an image, which is obtained by reducing the horizontal size and the vertical size of the original image to ½. The signals HL1, LH1, and HH1, respectively, represent images of a vertical edge component, a horizontal edge component, and an oblique edge component in the image having been reduced to a size ½ times as large as the size of the original image.

Thereafter, in the wavelet transform section 11, the wavelet transform is performed on the signal LL1. In this manner, signals HH2, HL2, LH2, and LL2 are obtained. The signal LL2 represents an image, which is obtained by reducing the horizontal size and the vertical size of the original image to ¼. The signals HL2, LH2, and HH2, respectively, represent images of a vertical edge component, a horizontal edge component, and an oblique edge component in the image having been reduced to a size ¼ times as large as the size of the original image.

In the same manner as that described above, the wavelet transform on the wavelet transform factor signal LLk, which is obtained in each frequency band, is iterated n number of times. In this manner, wavelet transform factor signals HH1 through HHn, HL1 through HLn, LH1 through LHn, and LL1 through LLn are obtained. The number of the pixels represented by each of the wavelet transform factor signals HHn, HLn, LHn, and LLn, which are obtained from the n'th wavelet transform, is equal to $(½)^n$ of the number of the pixels, which are represented by the original image signal Sorg, along each of the main scanning direction and the sub-scanning direction. Therefore, as the value of n becomes large, each wavelet transform factor signal is of a low frequency band and represents low frequency components among the frequency components of the original image signal Sorg. Accordingly, a wavelet transform factor signal HHk (wherein k=0 to n, this also applies to the descriptions below) represents a change in the frequency of the original image signal Sorg both in the main scanning direction and in the sub-scanning direction. As the value of k becomes large, the wavelet transform factor signal HHk becomes a low frequency signal. A wavelet transform factor signal HLk represents a change in the frequency of the original image signal Sorg in the main scanning direction. As the value of k becomes large, the wavelet transform factor signal HLk becomes a low frequency signal. A wavelet transform factor signal LHk represents a change in the frequency of the original image signal Sorg in the sub-scanning direction. As the value of k becomes large, the wavelet transform factor signal LHk becomes a low frequency signal.

Figure 5A:
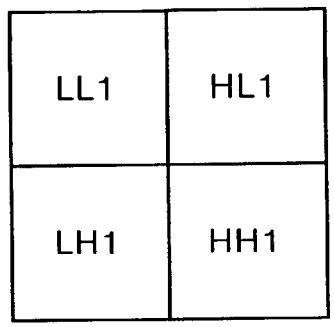
FIGS. 5A and 5B are explanatory views showing wavelet transform factor signals of a plurality of different frequency bands.
Figure 5B:
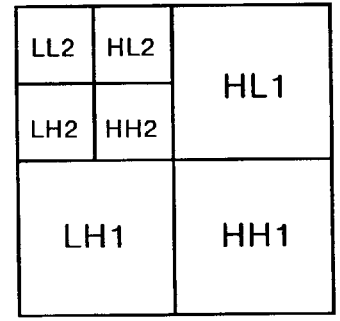

FIGS. 5A and 5B show the wavelet transform factor signals of the respective frequency bands. As an aid in facilitating the explanation, only the wavelet transform factor signals obtained from the first wavelet transform and the second wavelet transform, respectively, are shown in FIGS. 5A and 5B. In FIG. 5B, the signal LL2 represents the image, which is obtained by reducing the original image to ¼ in each of the main scanning direction and the sub-scanning direction.

Of the wavelet transform factor signals HHk, HLk, LHk, and LLk (wherein k=1 to n), the signals HHk, HLk, and LHk represent the edge components in the corresponding frequency band. In other words, the signals HHk, HLk, and LHk represent image information having a specific frequency band (band-limited image characteristics) in the original image, i.e. primarily the contrast of the image of the corresponding frequency band. Also, the total sum of the pixels represented by the wavelet transform factor signals HHk, HLk, and LHk of a certain frequency band takes a value close to zero. Further, as described above, the wavelet transform factor signal LLk represents the image obtained by reducing the size of the original image. In this embodiment, the wavelet transform factor signals HHk, HLk, and LHk are referred to as the band-limited image signals, and the wavelet transform factor signal LLk is referred to as the resolution signal. The band-limited image signals and the resolution signal are referred to as the wavelet transform factor signals.

Figure 6:
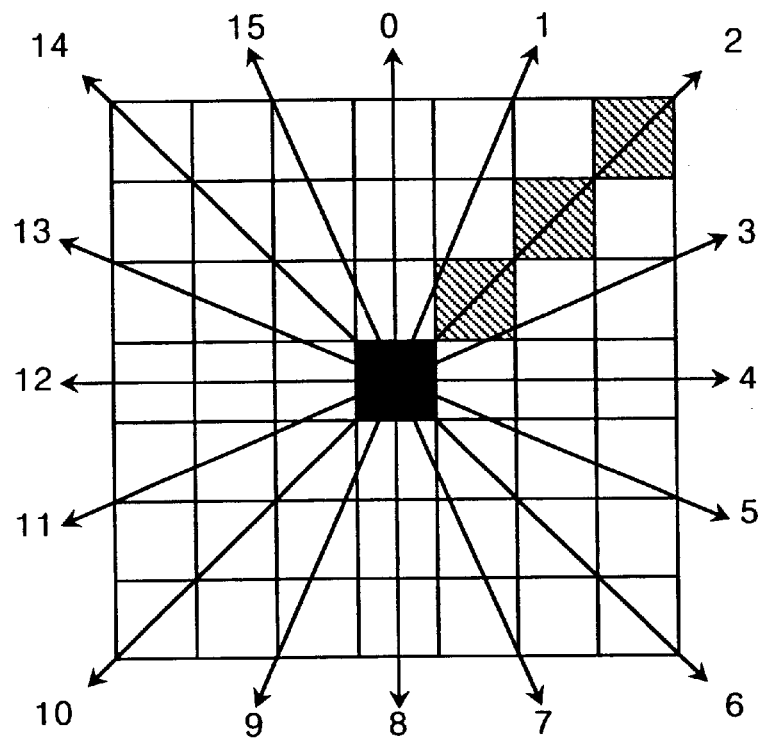
FIG. 6 is an explanatory view showing an example of how a pixel vector is calculated.
Figure 7:
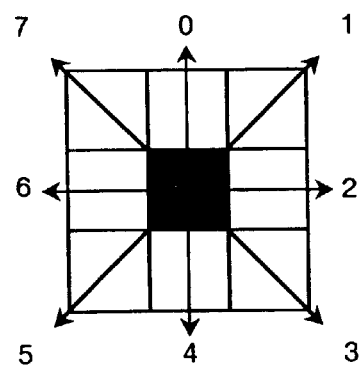
FIG. 7 is an explanatory view showing a different example of how a pixel vector is calculated.

In the pixel vector calculating means 2, the pixel vector is calculated in the manner described below. FIG. 6 is an explanatory view showing an example of how the pixel vector is calculated. The calculation of the pixel vector is performed with respect to every pixel in the image represented by each of the wavelet transform factor signals of every frequency band. With reference to FIG. 6, a certain pixel is taken as a pixel of interest (indicated in black in FIG. 6), and a region having a size of 7 pixels×7 pixels and having its center at the pixel of interest is set. Also, with respect to the 48 pixels neighboring with the pixel of interest in the region, a calculation is made to find the mean value of pixel values of the pixels, which lie on a line segment of a predetermined length along each of 16 directions (directions "0" through "15") extending from the pixel of interest. (Specifically, in the example of FIG. 6, a calculation is made to find the mean value of pixel values of the three pixels, e.g. the three hatched pixels located along the direction "2.") The difference between the pixel value of the pixel of interest and each of the thus calculated mean values is then calculated. The direction, which is associated with the smallest difference value, is determined. Alternatively, as illustrated in FIG. 7, by the utilization of eight pixels neighboring with the pixel of interest, a calculation may be made to find the difference between the pixel value of the pixel of interest and each of the neighboring pixels, and the direction associated with the smallest difference value may be determined. The thus determined direction is the direction along which the inclination of the image density is smallest and which is directed to the equi-signal line, i.e. is directed to the direction normal to the signal gradient direction. Thereafter, the vector having the thus determined direction and the reciprocal of the thus calculated difference value as the magnitude is calculated as the pixel vector. Therefore, as the difference in image density along the equi-signal line becomes small, the magnitude of the pixel vector becomes large. If the difference value is zero, the magnitude of the pixel vector will become the infinity. Therefore, as for the magnitude of the pixel vector, an upper limit value (e.g., 255 in the cases of 8 bits) should preferably be set.

The direction, which is associated with the largest value of the difference between the pixel value of the pixel of interest and the aforesaid mean value (or the difference between pixel value of the pixel of interest and the pixel value of the neighboring pixel), is the signal gradient direction. (The difference between the pixel value of the pixel of interest and the aforesaid mean value or the difference between pixel value of the pixel of interest and the pixel value of the neighboring pixel will hereinbelow be referred to simply as the difference.) The pixel vector may alternatively be calculated along the signal gradient direction. In such cases, as the magnitude of the pixel vector, the value of the difference described above may be employed. In this embodiment, the vector having the direction along the equi-signal line and having the reciprocal of the aforesaid difference value as the magnitude is calculated as the pixel vector.

As illustrated in FIG. 1, the pixel vector correcting means 3 comprises variance value calculating means 3a for calculating a variance value in a predetermined region containing the pixel of interest (i.e., a certain pixel) in the band-limited image of a certain frequency band (in this embodiment, a certain resolution level). The pixel vector correcting means 3 also comprises judgment means 3b for making a judgment as to whether the pixel vector at the pixel of interest is to be corrected or may not be corrected, the judgment being made in accordance with the variance value. The pixel vector correcting means 3 further comprises correction means 3c for operating such that, in cases where it has been judged that the pixel vector at the pixel of interest is to be corrected, the correction means 3c corrects the pixel vector at the pixel of interest in accordance with the pixel vector at the pixel, which corresponds to the pixel of interest, in a band-limited image of a frequency band lower than the certain frequency band (in this embodiment, a low resolution image of a resolution level lower than the aforesaid certain resolution level).

Figure 8A:
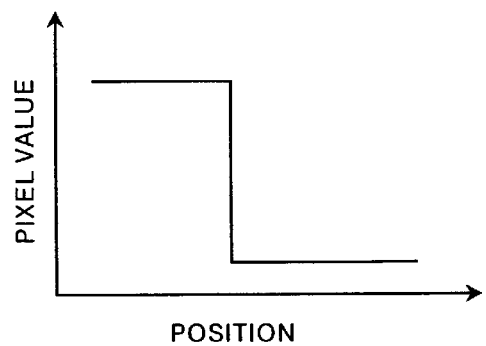
FIG. 8A is a graph showing an example of a profile of an original image signal.
Figure 8B:
FIGS. 8B, 8C, and 8D are graphs showing profiles of wavelet transform factor signals corresponding to the original image signal shown in FIG. 8A.
Figure 8C:
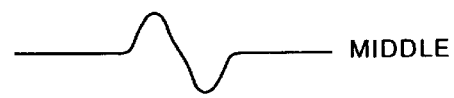
Figure 8D:

In the pixel vector correcting means 3, the variance value is calculated, and the pixel vector is corrected in the manner described below. Specifically, in cases where the wavelet transform is performed on the original image signal representing the original image, detail edge information is expressed in the image of a comparatively high frequency band. In the image of a middle frequency band, edge information of the middle frequency band is expressed. Also, in the image of a low frequency band, large edge information of the low frequency band is expressed ordinarily, the images of the respective frequency bands have the characteristics such that, as the frequency band becomes high, energy which the image of the high frequency band has becomes low, and such that energy of noise does not depend upon the frequency band. Therefore, as the frequency band becomes low, the image has a high signal-to-noise ratio. As for an area in the original image containing no noise (shown in FIG. 8A), a signal change occurs only at an edge area in every band-limited image (as shown in FIGS. 8B, 8C, and 8D). Therefore, in cases where the variance value of pixel values in a predetermined region containing the pixel of interest, for which the pixel vector has been calculated, in a comparatively high band-limited image is small, even if the pixel vector at the corresponding pixel in the image of a low frequency band is not referred to, it can be regarded that the pixel of interest, for which the pixel vector has been calculated, is located at a flat area in the image.

Figure 9A:
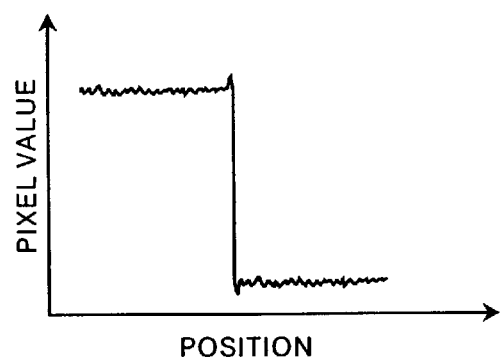
FIG. 9A is a graph showing a different example of a profile of an original image signal.
Figure 9B:
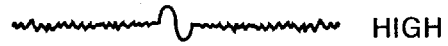
FIGS. 9B, 9C, and 9D are graphs showing profiles of wavelet transform factor signals corresponding to the original image signal shown in FIG. 9A, FIGS. 10A and 10B are explanatory views showing an example of how smoothing is performed.
Figure 9C:
Figure 9D:

As for an area in the original image containing noise (shown in FIG. 9A), in the high band-limited image (shown in FIG. 9B), the directions of the pixel vectors are disturbed by the effects of noise, and the variance value becomes large. However, as the frequency band becomes low (as shown in FIGS. 9C and 9D), the effects of noise upon the signal become small, and the variance value becomes small. Therefore, in cases where the variance value of pixel values in a predetermined region containing the pixel of interest, for which the pixel vector has been calculated, in a high band-limited image is large, if the pixel vector at the corresponding pixel in the image of a low frequency band is not referred to, it cannot be found whether the pixel of interest, for which the pixel vector has been calculated, is located at a flat area or at an edge area in the image.

Accordingly, the variance value calculating means 3a calculates the variance value of the pixel values of the pixels located in a region having a size of, for example, 3 pixels×3 pixels and having its center at the pixel of interest, for which the pixel vector has been calculated. The calculation of the variance value is made by taking each of all pixels in the image of the frequency band as the pixel of interest. The judgment means 3b makes a judgment as described below in accordance with the variance value having been calculated by the variance value calculating means 3a. Specifically, in cases where the variance value in the region is smaller than the variance values in the other regions in the image of the same frequency band, the judgment means 3b judges that the region is a flat area and that it is unnecessary for the correction of the pixel vector to be made. In cases where the variance value in the region is larger than the variance values in the other regions in the image of the same frequency band, it cannot be found whether the region is a flat area or an edge area in the image. Therefore, in such cases, the judgment means 3b judges that it is necessary for the correction of the pixel vector to be made. The correction means 3c obtains a corrected pixel vector in accordance with the results of the judgment made by the judgment means 3b. Specifically, in cases where it has been judged by the judgment means 3b that it is unnecessary for the correction of the pixel vector to be made (i.e., in cases where the variance value in the region is smaller than the variance values in the other regions in the image of the same frequency band), the correction means 3c takes the pixel vector, which has been calculated by the pixel vector calculating means 2, directly as the corrected pixel vector. In cases where it has been judged by the judgment means 3b that it is necessary for the correction of the pixel vector to be made (i.e., in cases where the variance value in the region is larger than the variance values in the other regions in the image of the same frequency band), the correction means 3c takes the pixel vector of the corresponding pixel in the image of a frequency band lower than the aforesaid frequency band (in this embodiment, a low resolution image of a resolution level lower than that of the aforesaid image) as the corrected pixel vector at the pixel of interest. In this manner, the pixel vector at a flat area is corrected as a pixel vector representing the flat area more accurately, and the pixel vector at an edge area is corrected as a pixel vector representing the edge area more accurately. Therefore, the probability that the pixel of interest, for which the pixel vector has been calculated, will be located at a flat area or an edge area is thus enhanced.

Alternatively, in the pixel vector correcting means 3, the difference value between the value of the pixel of interest, for which the pixel vector has been calculated, and the value of a neighboring pixel may be calculated as the variance value. Also, for example, in cases where the pixel vector has been calculated from the pixel of interest and eight neighboring pixels, the difference value described above may be the sum of the differences between the value of the pixel of interest and the values of the eight neighboring pixels, a mean value of the values of the differences, or the like.

Figures 10A, 10B, 11A, 11B, 12A, 12B:
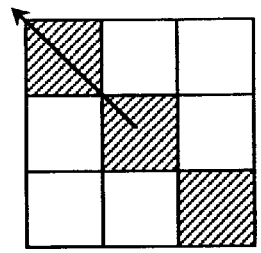
FIGS. 11A and 11B are explanatory views showing examples of smoothing filters.
FIGS. 12A and 12B are explanatory views showing examples of smoothed pixel values.

In the smoothing means 4, the smoothing is performed in the manner described below in accordance with the corrected pixel vector. The smoothing is performed on the band-limited image signals HHk, HLk, and LHk of each frequency band and the resolution signal LLn of the lowest resolution. FIGS. 10A and 10B are explanatory views showing an example of how the smoothing is performed in the smoothing means 4. In cases where the pixels located in the region having a size of 3 pixels×3 pixels and having its center at the pixel of interest take pixel values shown in FIG. 10A, the pixel vector (the corrected pixel vector) shown in FIG. 10B is obtained. Also, as indicated by the hatching in FIG. 10B, filtering is performed with a smoothing filter by utilizing the pixel of interest, the pixel lying in the pixel vector direction, and the pixel lying on the side reverse to the pixel vector direction. As the smoothing filter, one of various filters having directivity may be employed. For example, a mean value filter shown in FIG. 11A or a smoothing filter shown in FIG. 11B may be employed. In cases where the mean value filter shown in FIG. 11A is employed, the pixel values shown in FIG. 10A are smoothed as shown in FIG. 12A, and the pixel value of the pixel of interest becomes equal to 101. In cases where the smoothing filter shown in FIG. 11B is employed, as illustrated in FIG. 12B, the pixel values are smoothed such that the pixel value of the pixel of interest becomes equal to 141. In cases where the smoothing is performed in this manner, for example, if noise is mixed in an edge, the noise can be rendered imperceptible. Also, in cases where the smoothing is performed with respect to a flat area, noise contained in the flat area can be rendered imperceptible. The wavelet transform factor signal having been smoothed will hereinbelow be referred to as the smoothed signal (the smoothed band-limited image signal).

In this embodiment, the smoothing is performed by utilizing the pixel of interest, the pixel lying in the pixel vector direction, and the pixel lying on the side reverse to the pixel vector direction. Alternatively, the smoothing may be performed by utilizing only the pixel of interest and the pixel lying in the direction of the pixel vector. In such cases, the pixel of interest shown in FIG. 10A is smoothed so as to have a value of 99 (=(101+98)/2).

Figures 13, 14A, 14B:
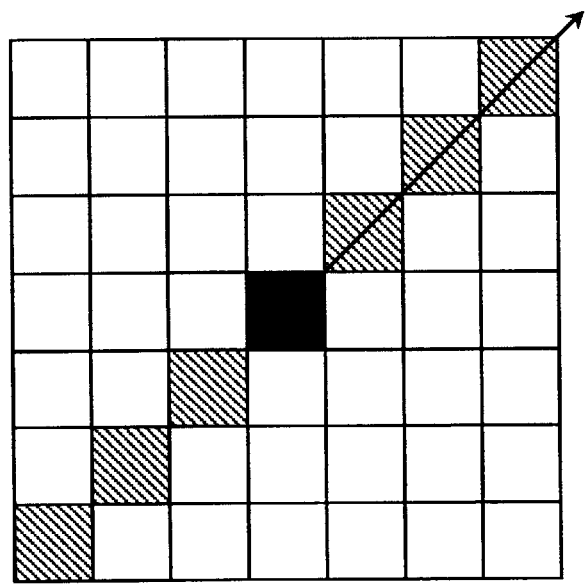
FIG. 13 is an explanatory view showing a different example of how smoothing is performed.
FIGS. 14A and 14B are explanatory views showing examples of results of reference made to pixel vectors by separation means.

Also, in cases where the pixel vector has been calculated from the 48 pixels neighboring with the pixel of interest, for example, the direction indicated by the arrow in FIG. 13 may be obtained as the direction of the pixel vector. In such cases, as indicated by the hatching in FIG. 13, the smoothing may be performed by utilizing the pixel of interest, the pixel lying in the pixel vector direction, and the pixel lying on the side reverse to the pixel vector direction. (Alternatively, the smoothing may be performed by utilizing only the pixel of interest and the pixel lying in the pixel vector direction.) Specifically, the mean value of the pixel values of the seven pixels hatched in FIG. 13 may be taken as the pixel value of the pixel of interest.

In the separation means 5, a noise component and an edge component are separated from the smoothed signal in accordance with the pixel vector or the corrected pixel vector in the manner described below. Specifically, a pixel, for which the corrected pixel vector having been obtained from the pixel vector correcting means 3 is large, is regarded as being located at an edge component. A pixel, for which the corrected pixel vector is small, is regarded as being located at a flat area, i.e. at a noise component. In this manner, each of the pixels in the image represented by the smoothed signal of each frequency band is labeled, and the edge component and the noise component are separated from the smoothed signal.

In cases where the pixel vector is small, it may be regarded that the pixel of interest is located at the flat area in the image, i.e. at the noise component in the image. However, in such cases, there is a probability that the pixel of interest will be located at a fine edge in the image. Therefore, the separation means 5 should preferably operate in the manner described below. Specifically, in cases where the pixel vector is small, reference is made to the direction of the pixel vector at the pixel of interest and the directions of the pixel vectors at the neighboring pixels. As illustrated in FIG. 14A, in cases where the pixel vectors at the neighboring pixels are directed in the same direction as that of the pixel vector at the pixel of interest, the pixel of interest is regarded as being located at the edge component. As illustrated in FIG. 14B, in cases where the pixel vectors at the neighboring pixels are directed in directions different from the direction of the pixel vector at the pixel of interest, the pixel of interest is regarded as being located at the noise component. In FIGS. 14A and 14B, the numeral at each pixel represents the direction of the pixel vector (shown in FIG. 7).

The processing means 6 performs enhancement processing for the edge component and smoothing processing for the noise component on the smoothed signal and in accordance with the results of the labeling having been performed by the separation means 5. Specifically, as for a pixel having been regarded as being located at the edge component, the enhancement processing is performed for setting the pixel value of the pixel at a large value. As for a pixel having been regarded as being located at the noise component, the smoothing processing is performed for setting the pixel value of the pixel at a small value. The enhancement processing and the smoothing processing are the processing for altering the pixel itself, i.e. the processing for altering the local contrast in each band-limited image, in accordance with the information concerning the edge component and the noise component, which has been separated by the separation means 5. Therefore, the enhancement processing and the smoothing processing are performed on only the smoothed band pass image signals HHk, HLk, and LHk, each of which represents the contrast of the image of each frequency band. From the processing, processed band pass image signals HHk', HLk', and LHk' (wherein k=1 to n) are obtained. As for the resolution signal, the smoothing has been performed by the smoothing means 4. Therefore, the resolution signal having been obtained from the smoothing is taken as a processed resolution signal LLn'. These signals are herein referred to as the processed signals HHk', HLk', LHk', and LLn' (wherein k=1 to n).

In cases where the pixel having been regarded as being located at the edge component is enhanced in the processing means 6, the degree of enhancement may be altered in accordance with the pixel value of the pixel. Specifically, in cases where the pixel value of the pixel is large, if the enhancement processing for setting the pixel value at a large value is performed, the edge will be enhanced excessively, and there will be the risk that overshooting or undershooting will occur in the image reproduced from the processed image signal Sproc. Therefore, in cases where the pixel value of the pixel is large, the degree of enhancement of the pixel may be set to be low. In this manner, the occurrence of overshooting or undershooting can be prevented.

Figure 15:
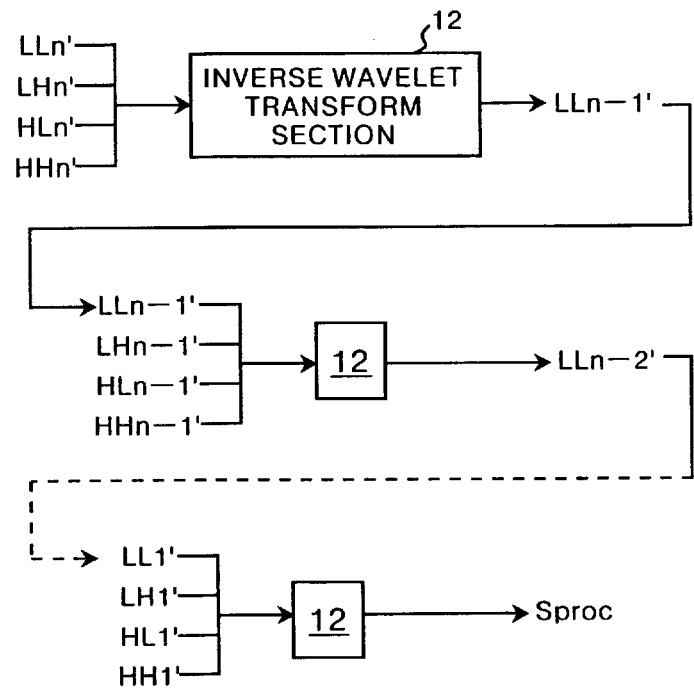
FIG. 15 is a block diagram showing inverse wavelet transform means.
Figure 16:
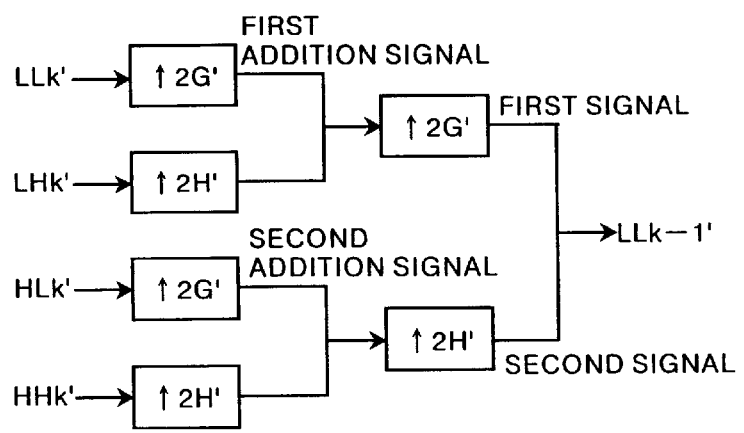
FIG. 16 is an explanatory view showing how processing is performed in an inverse wavelet transform section.

Thereafter, in the inverse wavelet transform means 7, the inverse wavelet transform is performed on the processed signals HHk', HLk', LHk', and LLn' having been obtained in the manner described above. FIG. 15 is a block diagram showing the inverse wavelet transform means 7. With reference to FIG. 15, in an inverse wavelet transform section 12, the inverse wavelet transform is performed on the processed signals HHn', HLn', LHn', and LLn' of the lowest frequency band, and a processed signal LLn−1' is obtained from the inverse wavelet transform. FIG. 16 is an explanatory view showing how the processing is performed in the inverse wavelet transform section 12. As illustrated in FIG. 16, each of the processed signal LLn' (LLk') and the processed signal LHn' (LHk') is subjected to the processing for leaving a space, which has a length equal to the length of a single pixel, between adjacent pixels located along the sub-scanning direction. (In FIG. 16, the processing for leaving the space between adjacent pixels is expressed as "2".) Also, filtering processing is performed on the thus obtained signals along the sub-scanning direction by utilizing inverse wavelet transform functions G' and H', which respectively correspond to the functions G and H. The signals having been obtained from the filtering processing are then added to each other, and a first addition signal is obtained from the addition. Thereafter, the first addition signal is subjected to the processing for leaving a space, which has a length equal to the length of a single pixel, between adjacent pixels located along the main scanning direction. Also, filtering processing is performed on the thus obtained signal along the main scanning direction by utilizing the function G'. In this manner, a first signal is obtained. Further, each of the processed signal HLn' (HLk') and the processed signal HHn' (HHk') is subjected to the processing for leaving a space, which has a length equal to the length of a single pixel, between adjacent pixels located along the sub-scanning direction. Also, filtering processing is performed on the thus obtained signals along the sub-scanning direction by utilizing the functions G' and H'. The signals having been obtained from the filtering processing are then added to each other, and a second addition signal is obtained from the addition. Thereafter, the second addition signal is subjected to the processing for leaving a space, which has a length equal to the length of a single pixel, between adjacent pixels located along the main scanning direction. Also, filtering processing is performed on the thus obtained signal along the main scanning direction by utilizing the function H'. In this manner, a second signal is obtained. The first signal and the second signal having thus been obtained are added to each other, and the processed signal LLn−1' (LLk−1') is thereby obtained.

Thereafter, in the inverse wavelet transform section 12, the inverse wavelet transform is performed on the processed signals HHn−1', HLn−1', LHn−1', and LLn−1' in the same manner as that described above. In this manner, a processed signal LLn−2' is obtained. In the same manner as that described above, the inverse wavelet transform is then iterated up to the highest frequency band. In this manner, the processed image signal Sproc is obtained.

Figure 17:
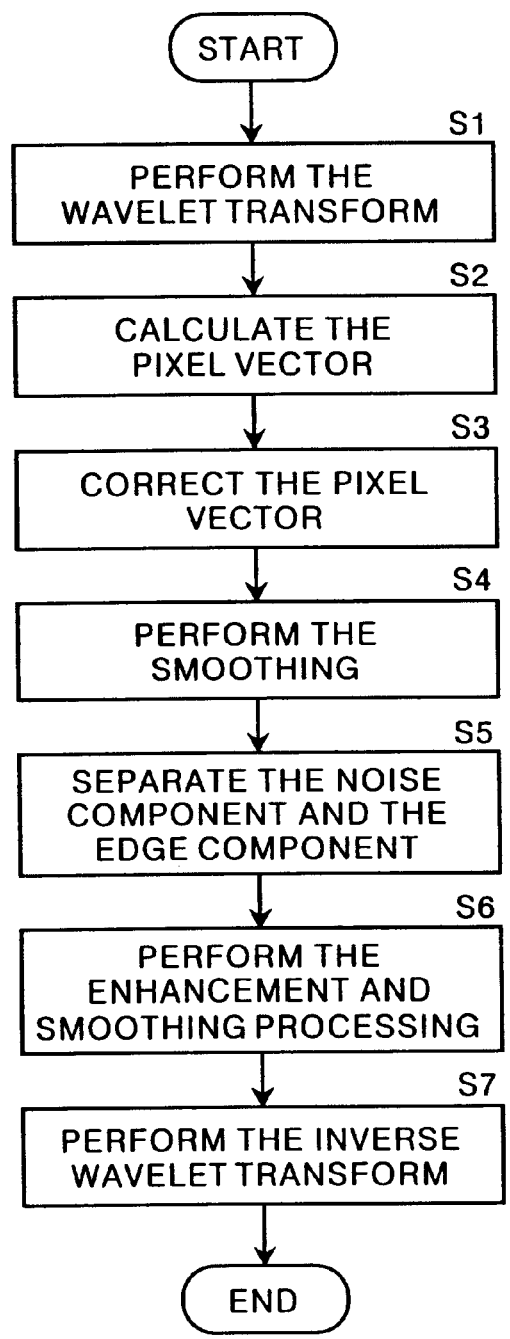
FIG. 17 is a flow chart showing how the first embodiment of the image processing apparatus in accordance with the present invention operates.

How the first embodiment of the image processing apparatus in accordance with the present invention operates will be described hereinbelow. FIG. 17 is a flow chart showing how the first embodiment of the image processing apparatus in accordance with the present invention operates. Firstly, in a step S1, the wavelet transform is performed by the wavelet transform means 1 on the original image signal Sorg, and the wavelet transform factor signals of the respective frequency bands are obtained. In a step S2, the pixel vector is calculated by the pixel vector calculating means 2 and in accordance with each of the wavelet transform factor signals. In a step S3, after the pixel vector has been calculated, the pixel vector is corrected by the pixel vector correcting means 3, and the corrected pixel vector is obtained. In a step S4, the smoothing is performed by the smoothing means 4 on each of the wavelet transform factor signals and in accordance with the corrected pixel vector, and the smoothed signal is obtained.

Thereafter, in a step S5, the processing for separating the noise component and the edge component is performed by the separation means 5 on the smoothed signal and in accordance with the corrected pixel vector having been obtained from the pixel vector correcting means 3. In a step S6, the enhancement processing for the edge component and the smoothing processing for the noise component are performed by the processing means 6 on the smoothed signal and in accordance with the results of the separation having been performed by the separation means 5. Specifically, as for a pixel having been regarded as being located at the edge component, the enhancement processing is performed for setting the pixel value of the pixel at a large value. As for a pixel having been regarded as being located at the noise component, the smoothing processing is performed for setting the pixel value of the pixel at a small value. As a result, the processed signals HHk', HLk', LHk', and LLn' are obtained. In a step S7, the inverse wavelet transform is performed by the inverse wavelet transform means 7 on the processed signals HHk', HLk', LHk', and LLn', and the processed image signal Sproc is obtained.

The processed signals HHk', HLk', LHk', and LLn', which are obtained in the respective frequency bands, have been subjected to the processing, wherein the noise component is suppressed and the edge component is enhanced. Therefore, in the processed image signal Sproc, which is obtained ultimately, the noise component has been suppressed and the edge component has been enhanced. Accordingly, a visible image having good image quality, in which noise is imperceptible and an edge is illustrated clearly, can be reproduced from the processed image signal Sproc.

In cases where noise is mixed in the original image, noise is also contained in the edge component in the image. In such cases, if the noise component and the edge component are separated in accordance with the pixel vector, and the edge component is then enhanced, noise contained in the edge component will also be enhanced. However, in this embodiment, the smoothing is performed by the smoothing means 4 in accordance with the direction of the pixel vector or the direction of the corrected pixel vector. Therefore, the noise component on the edge can be extracted such that the edge component may not be lost. Also, noise in the flat area other than the edge can also be extracted. Accordingly, ultimately, noise on the edge becomes imperceptible, noise in the flat area becomes imperceptible, and an image having good image quality can be reproduced.

Also, the noise component and the edge component of the smoothed band-limited image signal (i.e., the smoothed signal) are separated in accordance with the magnitude of the pixel vector, and thereafter the smoothing processing for the noise component and the enhancement processing for the edge component are performed on the smoothed signal in order to obtain the processed band-limited image signal. Thereafter, inverse wavelet transform is performed on the thus obtained processed band-limited image signals, and the processed image signal Sproc is thereby obtained. Therefore, the edge enhancement can be performed such that noise on the edge may not become perceptible. Also, noise in the flat area can be suppressed even further. Accordingly, an image having image quality enhanced even further can be obtained.

In the first embodiment described above, the processing means 6 performs both the enhancement of the pixel having been regarded as being located at the edge component and the smoothing of the pixel having been regarded as being located at the noise component. Alternatively, the processing means 6 may perform only either one of the enhancement and the smoothing. In such cases, an image, in which noise is imperceptible and the edge is perceptible, can be reproduced from the processed image signal Sproc.

Figure 18:
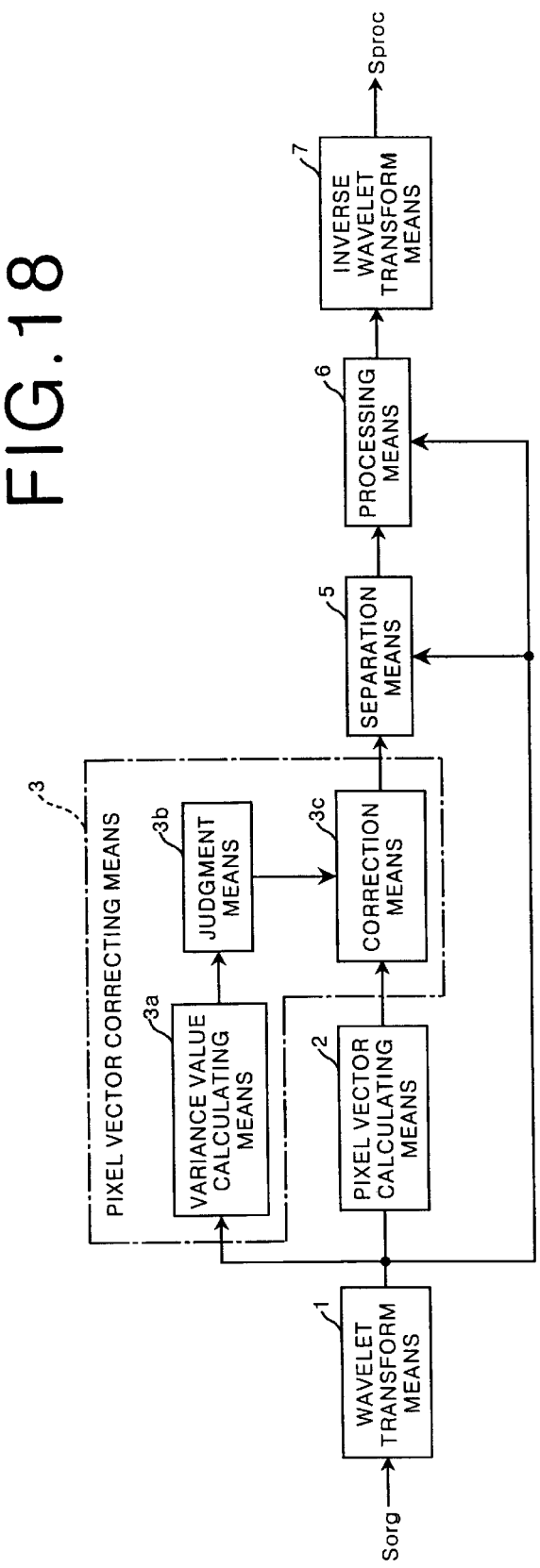
FIG. 18 is a block diagram showing a second embodiment of the image processing apparatus in accordance with the present invention.

Also, in the first embodiment described above, each of the wavelet transform factor signals is smoothed by the smoothing means 4. Alternatively, as in a second embodiment shown in FIG. 18 wherein the smoothing means 4 in the first embodiment is omitted, instead of each wavelet transform factor signal being smoothed, in the separation means 5, the processing for separating the edge component and the noise component may be performed directly on each wavelet transform factor signal, which has not been smoothed. Also, in the processing means 6, the processing may be performed on the band-limited image signal, which has not been smoothed. In such cases, if the enhancement processing is performed by the processing means 6 on the pixel having been regarded as being located at the edge component, the problems will occur in that noise contained in the edge component is enhanced. Therefore, the first embodiment, wherein the smoothing means 4 is provided, is advantageous for obtaining an image having good image quality.

Figure 19:
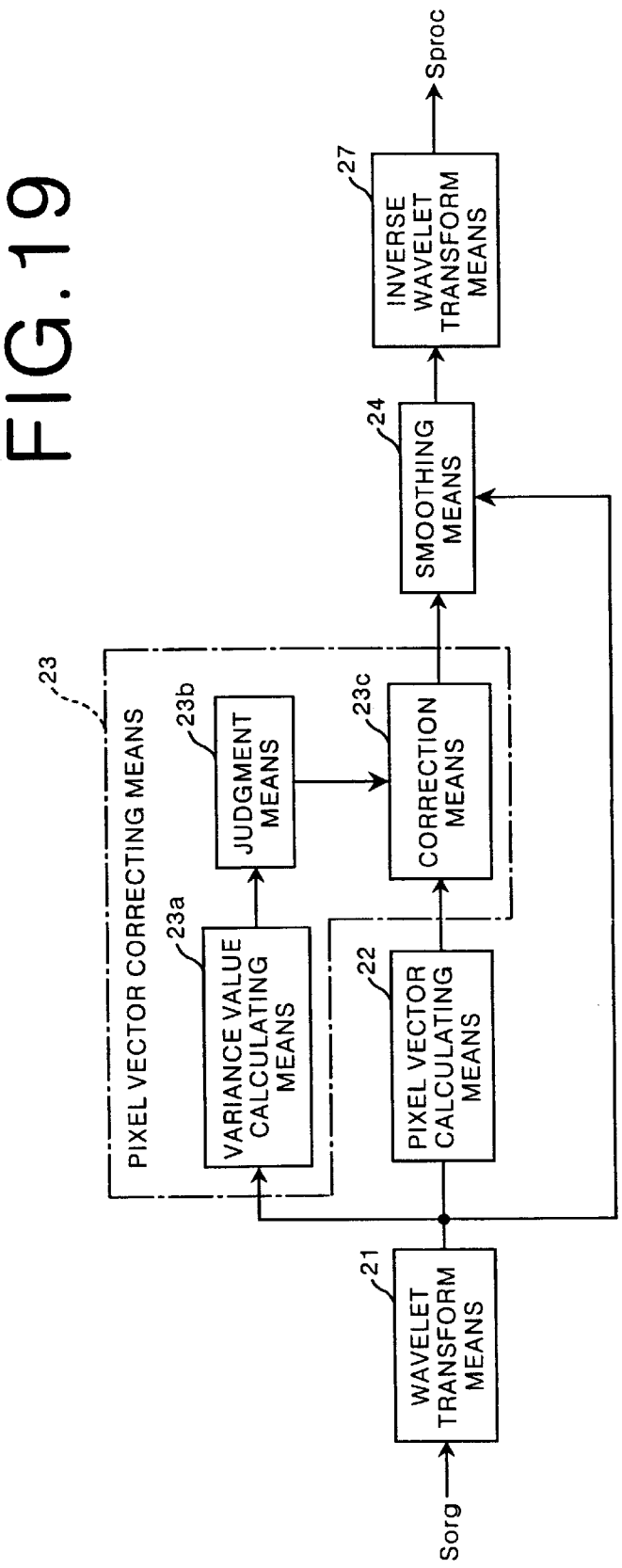
FIG. 19 is a block diagram showing a third embodiment of the image processing apparatus in accordance with the present invention.

A third embodiment of the image processing apparatus in accordance with the present invention will be described hereinbelow. FIG. 19 is a block diagram showing the third embodiment of the image processing apparatus in accordance with the present invention. With reference to FIG. 19, the third embodiment of the image processing apparatus in accordance with the present invention comprises wavelet transform means 21 for performing wavelet transform on an original image signal Sorg, which represents a radiation image, to obtain a plurality of wavelet transform factor signals. The image processing apparatus also comprises pixel vector calculating means 22 for calculating a pixel vector from each of the wavelet transform factor signals, which have been obtained from the wavelet transform means 21. The image processing apparatus further comprises pixel vector correcting means 23 for correcting the pixel vector having been calculated by the pixel vector calculating means 22. The image processing apparatus still further comprises smoothing means 24 for smoothing the wavelet transform factor signal in accordance with the corrected pixel vector, which has been obtained from the pixel vector correcting means 23, and obtaining a smoothed signal. The image processing apparatus also comprises inverse wavelet transform means 27 for performing inverse wavelet transform processing on the smoothed signals, which have been obtained from the smoothing means 24, and obtaining a processed image signal sproc. The third embodiment is constituted basically in the same manner as that in the first embodiment, except that the separation means 5 is not provided and the smoothed signals obtained from the smoothing means 24 are subjected to the inverse wavelet transform performed by the inverse wavelet transform means 27 for obtaining the processed image signal Sproc.

The processings performed in the wavelet transform means 21, the pixel vector calculating means 22, the pixel vector correcting means 23, the smoothing means 24, and the inverse wavelet transform means 27 are the same as those performed in the wavelet transform means 1, the pixel vector calculating means 2, the pixel vector correcting means 3, the smoothing means 4, and the inverse wavelet transform means 7 in the first embodiment described above.

FIG. 20 is a flow chart showing how the third embodiment of the image processing apparatus in accordance with the present invention operates. As illustrated in FIG. 20, firstly, in a step S11, the wavelet transform is performed by the wavelet transform means 21 on the original image signal Sorg, and the wavelet transform factor signals of the respective frequency bands are obtained. In a step S12, the pixel vector is calculated by the pixel vector calculating means 12 and in accordance with each of the wavelet transform factor signals. In a step S13, after the pixel vector has been calculated, the pixel vector is corrected by the pixel vector correcting means 23, and the corrected pixel vector is obtained. In a step S14, the smoothing is performed by the smoothing means 24 on each of the wavelet transform factor signals and in accordance with the corrected pixel vector, and the smoothed signal is obtained. Thereafter, in a step S15, the smoothed signals having thus been obtained are taken as the processed signals, and the inverse wavelet transform is performed by the inverse wavelet transform means 27 on the processed signals. In this manner, the processed image signal Sproc is obtained.

In cases where noise is mixed in the original image, noise is also contained in the edge component in the image. However, in cases where the smoothing is performed in accordance with the pixel vector, noise contained in the edge component becomes imperceptible, and noise at the flat area also becomes imperceptible. With the third embodiment, the smoothing is performed on each of the wavelet transform factor signals of the respective frequency bands. As a result, in each of the smoothed band-limited images, the noise component becomes imperceptible, and the edge component becomes more perceptible. Accordingly, in the processed image signal Sproc obtained by performing the inverse wavelet transform on the thus obtained smoothed band-limited image signals, the edge component becomes perceptible, and the noise component becomes imperceptible. As a result, an image having good image quality can be reproduced from the processed image signal Sproc.

In the third embodiment, as in the first embodiment, the smoothing is performed by the smoothing means 24 in accordance with the direction of the pixel vector or the direction of the corrected pixel vector. Therefore, the edge component is not lost, and noise in the flat area other than the edge can be suppressed. Accordingly, an image having good image quality, in which the edge is kept and noise is imperceptible, can be reproduced.

In the first, second, and third embodiments described above, the pixel vector calculating means 2 and the pixel vector calculating means 22 takes the direction, which is associated with the smallest value of the difference between the pixel value of the pixel of interest and the mean value of the pixel values of the neighboring pixels (or the pixel value of the neighboring pixel), as the direction of the pixel vector. Alternatively, the direction, which is associated with the second smallest value of the difference, may be obtained as the direction of a second pixel vector. As another alternative, in cases where the pixel vector is calculated along the signal gradient direction, the direction, which is associated with the second largest value of the difference, may be obtained as the direction of a second pixel vector. In cases where the second pixel vector is obtained in this manner, if an edge component takes on a bent form as shown in, for example, FIG. 21A, two pixel vectors will be obtained as shown in FIG. 21B. In such cases, in the smoothing means 4 or smoothing means 24, the smoothing may be performed by utilizing both the first pixel vector and the second pixel vector. In this manner, the smoothing can be performed more accurately, while the directivity of the edge component is being kept.

Also, a comparatively large edge component contained in the original image remains in the image of a low frequency band, and a noise component contained in the original image becomes small in the image of the low frequency band. Therefore, the direction of the pixel vector at a certain pixel in a band-limited image of a certain frequency band may be corrected so as to coincide with the direction of the pixel vector at the pixel, which corresponds to the certain pixel, in the band-limited image of a frequency band lower than the certain frequency band. In such cases, if the certain pixel is located at the edge component, the corrected pixel vector will represent the edge component more accurately. In the image of the low frequency band, a fine noise component becomes smaller than in the image of the high frequency band. Therefore, in cases where the certain pixel is located at the noise component, in the image of the low frequency band, the pixel vector is directed in a random direction, and the magnitude of the pixel vector becomes small. In such cases, the corrected pixel vector represents the flat area, i.e. represents the noise component, more accurately. Accordingly, in the first, second, and third embodiments described above, in lieu of the processing in accordance with the variance value, the pixel vector correcting means 3 or the pixel vector correcting means 23 may make a correction such that the direction of the pixel vector at a certain pixel in the band-limited image of a certain frequency band coincides with the direction of the pixel vector at the pixel, which corresponds to the certain pixel, in the band-limited image of a frequency band lower than the certain frequency band. In this manner, the probability that the certain pixel will be located at the edge component or the noise component can be enhanced. Particularly, in the first and second embodiments described above, the separation of the noise component and the edge component can be performed more accurately in the separation means 5.

Further, in the first, second, and third embodiments described above, the pixel vector is corrected by the pixel vector correcting means 3 or the pixel vector correcting means 23. Alternatively, in the first and second embodiments described above, the smoothing and the separation of the noise component and the edge component may be performed by directly utilizing the pixel vector, which has been calculated by the pixel vector calculating means 2. Also, in the third embodiment described above, the smoothing may be performed by directly utilizing the pixel vector, which has been calculated by the pixel vector calculating means 22.

As image signal storage formats, various formats, such as a JPEG format, a GIF format, and a TIFF format, have heretofore been used. Recently, a file format has been proposed, in which an image signal is decomposed hierarchically into different resolutions, and the signal of each hierarchy (the hierarchical signal) is encoded and stored in the compressed form. Specifically, with the file format, an original image signal is decomposed into hierarchical signals of a plurality of different resolutions with the wavelet transform, or the like. Also, the hierarchical signals of the respective resolutions are encoded in the order of the hierarchy, compressed as a single file, and stored in this form. Therefore, in cases where the image signal of such a file format is formed, the processing in accordance with the present invention may be performed simultaneously. In this manner, the image signal of the file format can be formed such that an image, in which noise has been suppressed and an edge is perceptible, can be reproduced from the image signal. Further, since the processing in accordance with the present invention and the processing for hierarchical decomposition and compression of the image signal can be performed simultaneously, compression of the image signal can be performed efficiently.

As for radiation images, energy subtraction processing is often performed in the manner described below. Specifically, an object, such as the chest of a human body, which is constituted of soft tissues and bones, is exposed to several kinds of radiation with different energy levels, and a plurality of radiation images of the object are thereby obtained. The plurality of the radiation images are read out, and a plurality of image signals representing the radiation images are generated. Energy subtraction processing is then carried out on the plurality of the image signals. From the energy subtraction processing, a soft tissue image signal is obtained which represents a soft tissue image primarily composed of patterns of the soft tissues of the object. Alternatively, a bone image signal is obtained which represents a bone image primarily composed of patterns of the bones of the object. Thereafter, the soft tissue image is reproduced as a visible image from the soft tissue image signal, or the bone image is reproduced as a visible image from the bone image signal. A novel method of forming an energy subtraction image has been proposed in, for example, Japanese Unexamined Patent Publication No. 5(1993)-236351. Such that noise components of a soft tissue image or a bone image may be suppressed, the proposed method of forming an energy subtraction image comprises the steps of: (i) performing a first process, wherein smoothing processing is performed on a bone image signal to obtain a first smoothed image signal, and the first smoothed image signal is subtracted from an original image signal to obtain a soft tissue image signal representing a soft tissue image, (ii) performing a second process, wherein smoothing processing is performed on the soft tissue image signal to obtain a second smoothed image signal, and the second smoothed image signal is subtracted from the original image signal to obtain a bone image signal, in which noise has been eliminated, and (iii) iterating the first process and the second process to suppress noise components. In the proposed method of forming an energy subtraction image, when the smoothed image is obtained, the processing in accordance with the present invention may be performed. In cases where the processing in accordance with the present invention is performed to obtain the smoothed image signal in the method of forming an energy subtraction image, only the noise component can be suppressed, and the edge component can be rendered perceptible. Therefore, a soft tissue image or a bone image having good image quality can be obtained.

Furthermore, in the first, second, and third embodiments described above, the aforesaid processing in accordance with the pixel vector is performed on the signals, which are obtained by performing the wavelet transform on the original image signal Sorg. The processing may also be performed in the same manner as that described above on the band-limited image signals of the respective frequency bands, which signals are obtained with the other techniques for the multi-resolution transform of the original image signal Sorg, such as the Laplacian pyramid technique, and the band-limited image signals, which are obtained by utilizing techniques other than the multi-resolution transform processing.

What is claimed is:

1. An image processing method, comprising the steps of:
   i) forming band-limited image signals representing images, each of which is of one of a plurality of different frequency bands, from an original image signal representing an original image,
   ii) calculating a pixel vector at each of pixels in each of the band-limited images, which are represented by the band-limited image signals,
   iii) separating a noise component and an edge component of each of the band-limited images in accordance with the calculated pixel vector,
   iv) performing smoothing processing for the noise component and/or enhancement processing for the edge component on each of the band-limited image signals to obtain a processed band-limited image signal, and
   v) obtaining a processed image signal in accordance with the thus obtained processed band-limited image signals wherein the pixel vector represents a direction and magnitude of inclination of pixel value of the pixel of interest in relation to a neighboring pixel.

2. A method as defined in claim 1 wherein the separation of the noise component and the edge component is performed in accordance with the pixel vector having been calculated for each pixel and a pixel vector at a pixel neighboring with each pixel.

3. A method as defined in claim 1 or 2 wherein the pixel vector at a certain pixel in a band-limited image of a certain frequency band is corrected in accordance with the pixel vector at the pixel, which corresponds to the certain pixel, in a band-limited image of a frequency band lower than the certain frequency band, and
   the separation of the noise component and the edge component is performed in accordance with the corrected pixel vector in lieu of the pixel vector at the certain pixel before being corrected.

4. A method as defined in claim 1 or 2 wherein a variance value in a predetermined region containing a certain pixel in a band-limited image of a certain frequency band is calculated,
   a judgment as to whether the pixel vector at the certain pixel is to be corrected or may not be corrected is made in accordance with the variance value,
   in cases where it has been judged that the pixel vector at the certain pixel is to be corrected, the pixel vector at the certain pixel is corrected in accordance with the pixel vector at the pixel, which corresponds to the certain pixel, in a band-limited image of a frequency band lower than the certain frequency band, and
   the separation of the noise component and the edge component is performed in accordance with the corrected pixel vector in lieu of the pixel vector at the certain pixel before being corrected.

5. A method as defined in claim 1 or 2 wherein multi-resolution transform processing is performed on the original image signal to form the band-limited image signals, and
   inverse multi-resolution transform processing is performed on the processed band-limited image signals to obtain the processed image signal.

6. An image processing method, comprising the steps of:
   i) forming band-limited image signals representing images, each of which is of one of a plurality of different frequency bands, from an original image signal representing an original image,
   ii) calculating a pixel vector at each of pixels in each of the band-limited images, which are represented by the band-limited image signals, iii) smoothing each of the band-limited image signals in accordance with a direction of the calculated pixel vector to obtain a smoothed band-limited image signal, and iv) obtaining a processed image signal in accordance with the thus obtained smoothed band-limited image signals wherein the pixel vector represents a direction and magnitude of inclination of pixel value of the pixel of interest in relation to a neighboring pixel.

7. A method as defined in claim 6 wherein a neighboring pixel vector at a pixel neighboring with a certain pixel is calculated, and the smoothing is performed in accordance with the direction of the pixel vector at the certain pixel and the direction of the neighboring pixel vector.

8. A method as defined in claim 6 or 7 wherein the pixel vector at a certain pixel in a band-limited image of a certain frequency band is corrected in accordance with the pixel vector at the pixel, which corresponds to the certain pixel, in a band-limited image of a frequency band lower than the certain frequency band, and the smoothing is performed in accordance with the direction of the corrected pixel vector in lieu of the direction of the pixel vector at the certain pixel before being corrected.

9. A method as defined in claim 6 or 7 wherein a variance value in a predetermined region containing a certain pixel in a band-limited image of a certain frequency band is calculated, a judgment as to whether the pixel vector at the certain pixel is to be corrected or may not be corrected is made in accordance with the variance value, in cases where it has been judged that the pixel vector at the certain pixel is to be corrected, the pixel vector at the certain pixel is corrected in accordance with the pixel vector at the pixel, which corresponds to the certain pixel, in a band-limited image of a frequency band lower than the certain frequency band, and the smoothing is performed in accordance with the direction of the corrected pixel vector in lieu of the direction of the pixel vector at the certain pixel before being corrected.

10. A method as defined in claim 6 or 7 wherein a noise component and an edge component of each of smoothed band-limited images, which are represented by the smoothed band-limited image signals, are separated in accordance with a magnitude of the pixel vector, smoothing processing for the noise component and/or enhancement processing for the edge component is performed on each of the smoothed band-limited image signals to obtain a processed band-limited image signal, and the processed image signal is obtained in accordance with the thus obtained processed band-limited image signals in lieu of the smoothed band-limited image signals.

11. A method as defined in claim 10 wherein a neighboring pixel vector at a pixel neighboring with a certain pixel is calculated, and the separation of the noise component and the edge component is performed in accordance with the magnitude of the pixel vector at the certain pixel and the magnitude of the neighboring pixel vector.

12. A method as defined in claim 10 wherein the pixel vector at a certain pixel in a band-limited image of a certain frequency band is corrected in accordance with the pixel vector at the pixel, which corresponds to the certain pixel, in a band-limited image of a frequency band lower than the certain frequency band, and the separation of the noise component and the edge component is performed in accordance with the magnitude of the corrected pixel vector in lieu of the magnitude of the pixel vector at the certain pixel before being corrected.

13. A method as defined in claim 10 wherein a variance value in a predetermined region containing a certain pixel in a band-limited image of a certain frequency band is calculated, a judgment as to whether the pixel vector at the certain pixel is to be corrected or may not be corrected is made in accordance with the variance value, in cases where it has been judged that the pixel vector at the certain pixel is to be corrected, the pixel vector at the certain pixel is corrected in accordance with the pixel vector at the pixel, which corresponds to the certain pixel, in a band-limited image of a frequency band lower than the certain frequency band, and the separation of the noise component and the edge component is performed in accordance with the magnitude of the corrected pixel vector in lieu of the magnitude of the pixel vector at the certain pixel before being corrected.

14. A method as defined in claim 6 or 7 wherein multi-resolution transform processing is performed on the original image signal to form the band-limited image signals, and inverse multi-resolution transform processing is performed on the smoothed band-limited image signals to obtain the processed image signal.

15. A method as defined in claim 10 wherein multi-resolution transform processing is performed on the original image signal to form the band-limited image signals, and inverse multi-resolution transform processing is performed on the processed band-limited image signals to obtain the processed image signal.

16. An image processing apparatus, comprising:

i) band-limited image signal forming means for forming band-limited image signals representing images, each of which is of one of a plurality of different frequency bands, from an original image signal representing an original image, ii) pixel vector calculating means for calculating a pixel vector at each of pixels in each of the band-limited images, which are represented by the band-limited image signals, iii) separation means for separating a noise component and an edge component of each of the band-limited images in accordance with the calculated pixel vector, iv) processing means for performing smoothing processing for the noise component and/or enhancement processing for the edge component on each of the band-limited image signals to obtain a processed band-limited image signal, and v) image signal generating means for obtaining a processed image signal in accordance with the thus obtained processed band-limited image signals wherein the pixel vector represents a direction and magnitude of inclination of pixel value of the pixel of interest in relation to a neighboring pixel.

17. An apparatus as defined in claim 16 wherein the separation means performs the separation of the noise component and the edge component in accordance with the pixel vector having been calculated for each pixel and a pixel vector at a pixel neighboring with each pixel.

18. An apparatus as defined in claim 16 or 17 wherein the apparatus further comprises correction means for correcting the pixel vector at a certain pixel in a band-limited image of a certain frequency band in accordance with the pixel vector at the pixel, which corresponds to the certain pixel, in a band-limited image of a frequency band lower than the certain frequency band, and the separation means separates the noise component and the edge component in accordance with the corrected pixel vector in lieu of the pixel vector at the certain pixel before being corrected.

19. An apparatus as defined in claim 16 or 17 wherein the apparatus further comprises:
 a) variance value calculating means for calculating a variance value in a predetermined region containing a certain pixel in a band-limited image of a certain frequency band,
 b) judgment means for making a judgment as to whether the pixel vector at the certain pixel is to be corrected or may not be corrected, the judgment being made in accordance with the variance value, and
 c) correction means for operating such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the separation means separates the noise component and the edge component in accordance with the corrected pixel vector in lieu of the pixel vector at the certain pixel before being corrected.

20. An apparatus as defined in claim 16 or 17 wherein the band-limited image signal forming means is provided with multi-resolution transform processing means for performing multi-resolution transform processing on the original image signal to form the band-limited image signals, and the image signal generating means is provided with inverse multi-resolution transform processing means for performing inverse multi-resolution transform processing on the processed band-limited image signals to obtain the processed image signal.

21. An image processing apparatus, comprising:
 i) band-limited image signal forming means for forming band-limited image signals representing images, each of which is of one of a plurality of different frequency bands, from an original image signal representing an original image,
 ii) pixel vector calculating means for calculating a pixel vector at each of pixels in each of the band-limited images, which are represented by the band-limited image signals,
 iii) smoothing means for smoothing each of the band-limited image signals in accordance with a direction of the calculated pixel vector to obtain a smoothed band-limited image signal, and
 iv) image signal generating means for obtaining a processed image signal in accordance with the thus obtained smoothed band-limited image signals wherein the pixel vector represents a direction and magnitude of inclination of pixel value of the pixel of interest in relation to a neighboring pixel.

22. An apparatus as defined in claim 21 wherein the smoothing means calculates a neighboring pixel vector at a pixel neighboring with a certain pixel and performs the smoothing in accordance with the direction of the pixel vector at the certain pixel and the direction of the neighboring pixel vector.

23. An apparatus as defined in claim 21 or 22 wherein the apparatus further comprises correction means for correcting the pixel vector at a certain pixel in a band-limited image of a certain frequency band in accordance with the pixel vector at the pixel, which corresponds to the certain pixel, in a band-limited image of a frequency band lower than the certain frequency band, and the smoothing means performs the smoothing in accordance with the direction of the corrected pixel vector in lieu of the direction of the pixel vector at the certain pixel before being corrected.

24. An apparatus as defined in claim 21 or 22 wherein the apparatus further comprises:
 a) variance value calculating means for calculating a variance value in a predetermined region containing a certain pixel in a band-limited image of a certain frequency band,
 b) judgment means for making a judgment as to whether the pixel vector at the certain pixel is to be corrected or may not be corrected, the judgment being made in accordance with the variance value, and
 c) correction means for operating such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the smoothing means performs the smoothing in accordance with the direction of the corrected pixel vector in lieu of the direction of the pixel vector at the certain pixel before being corrected.

25. An apparatus as defined in claim 21 or 22 wherein the apparatus further comprises:
 separation means for separating a noise component and an edge component of each of smoothed band-limited images, which are represented by the smoothed band-limited image signals, in accordance with a magnitude of the pixel vector, and
 processing means for performing smoothing processing for the noise component and/or enhancement processing for the edge component on each of the smoothed band-limited image signals to obtain a processed band-limited image signal, and
 the image signal generating means obtains the processed image signal in accordance with the thus obtained processed band-limited image signals in lieu of the smoothed band-limited image signals.

26. An apparatus as defined in claim 25 wherein the separation means separates the noise component and the edge component in accordance with the magnitude of the pixel vector at a certain pixel and the magnitude of a neighboring pixel vector at a pixel neighboring with the certain pixel.

27. An apparatus as defined in claim 25 wherein the apparatus further comprises correction means for correcting the pixel vector at a certain pixel in a band-limited image of a certain frequency band in accordance with the pixel vector at the pixel, which corresponds to the certain pixel, in a band-limited image of a frequency band lower than the certain frequency band, and the separation means separates the noise component and the edge component in accordance with the magnitude of the corrected pixel vector in lieu of the magnitude of the pixel vector at the certain pixel before being corrected.

28. An apparatus as defined in claim 25 wherein the apparatus further comprises:

a) variance value calculating means for calculating a variance value in a predetermined region containing a certain pixel in a band-limited image of a certain frequency band, b) judgment means for making a judgment as to whether the pixel vector at the certain pixel is to be corrected or may not be corrected, the judgment being made in accordance with the variance value, and c) correction means for operating such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the separation means separates the noise component and the edge component in accordance with the magnitude of the corrected pixel vector in lieu of the magnitude of the pixel vector at the certain pixel before being corrected.

29. An apparatus as defined in claim 21 or 22 wherein the band-limited image signal forming means is provided with multi-resolution transform processing means for performing multi-resolution transform processing on the original image signal to form the band-limited image signals, and the image signal generating means is provided with inverse multi-resolution transform processing means for performing inverse multi-resolution transform processing on the smoothed band-limited image signals to obtain the processed image signal.

30. An apparatus as defined in claim 25 wherein the band-limited image signal forming means is provided with multi-resolution transform processing means for performing multi-resolution transform processing on the original image signal to form the band-limited image signals, and the image signal generating means is provided with inverse multi-resolution transform processing means for performing inverse multi-resolution transform processing on the processed band-limited image signals to obtain the processed image signal.

31. A recording medium, on which a program for causing a computer to execute an image processing method has been recorded and from which the computer is capable of reading the program, wherein the program comprises the procedures for:

i) forming band-limited image signals representing images, each of which is of one of a plurality of different frequency bands, from an original image signal representing an original image, ii) calculating a pixel vector at each of pixels in each of the band-limited images, which are represented by the band-limited image signals, iii) separating a noise component and an edge component of each of the band-limited images in accordance with the calculated pixel vector, iv) performing smoothing processing for the noise component and/or enhancement processing for the edge component on each of the band-limited image signals to obtain a processed band-limited image signal, and v) obtaining a processed image signal in accordance with the thus obtained processed band-limited image signals wherein the pixel vector represents a direction and magnitude of inclination of pixel value of the pixel of interest in relation to a neighboring pixel.

32. A recording medium as defined in claim 31 wherein the procedure for the separation is a procedure for performing the separation of the noise component and the edge component in accordance with the pixel vector having been calculated for each pixel and a pixel vector at a pixel neighboring with each pixel.

33. A recording medium as defined in claim 31 or 32 wherein the program further comprises the procedure for correcting the pixel vector at a certain pixel in a band-limited image of a certain frequency band in accordance with the pixel vector at the pixel, which corresponds to the certain pixel, in a band-limited image of a frequency band lower than the certain frequency band, and the procedure for the separation is a procedure for separating the noise component and the edge component in accordance with the corrected pixel vector in lieu of the pixel vector at the certain pixel before being corrected.

34. A recording medium as defined in claim 31 or 32 wherein the program further comprises the procedures for:

a) calculating a variance value in a predetermined region containing a certain pixel in a band-limited image of a certain frequency band, b) making a judgment as to whether the pixel vector at the certain pixel is to be corrected or may not be corrected, the judgment being made in accordance with the variance value, and c) performing an operation such that, in cases where it has been judged that the pixel vector at the certain pixel is to be corrected, the pixel vector at the certain pixel is corrected in accordance with the pixel vector at the pixel, which corresponds to the certain pixel, in a band-limited image of a frequency band lower than the certain frequency band, and the procedure for the separation is a procedure for separating the noise component and the edge component in accordance with the corrected pixel vector in lieu of the pixel vector at the certain pixel before being corrected.

35. A recording medium as defined in claim 31 or 32 wherein the procedure for forming the band-limited image signals is a procedure for performing multi-resolution transform processing on the original image signal to form the band-limited image signals, and the procedure for obtaining the processed image signal is a procedure for performing inverse multi-resolution transform processing on the processed band-limited image signals to obtain the processed image signal.

36. A recording medium, on which a program for causing a computer to execute an image processing method has been recorded and from which the computer is capable of reading the program, wherein the program comprises the procedures for:

i) forming band-limited image signals representing images, each of which is of one of a plurality of different frequency bands, from an original image signal representing an original image, ii) calculating a pixel vector at each of pixels in each of the band-limited images, which are represented by the band-limited image signals, iii) smoothing each of the band-limited image signals in accordance with a direction of the calculated pixel vector to obtain a smoothed band-limited image signal, and iv) obtaining a processed image signal in accordance with the thus obtained smoothed band-limited image signals wherein the pixel vector represents a direction and magnitude of inclination of pixel value of the pixel of interest in relation to a neighboring pixel.

37. A recording medium as defined in claim 36 wherein the procedure for obtaining the smoothed band-limited image signal is a procedure for performing the smoothing in accordance with the direction of the pixel vector at a certain pixel and the direction of a neighboring pixel vector at a pixel neighboring with the certain pixel.

38. A recording medium as defined in claim 36 or 37 wherein the program further comprises the procedure for correcting the pixel vector at a certain pixel in a band-limited image of a certain frequency band in accordance with the pixel vector at the pixel, which corresponds to the certain pixel, in a band-limited image of a frequency band lower than the certain frequency band, and the procedure for obtaining the smoothed band-limited image signal is a procedure for performing the smoothing in accordance with the direction of the corrected pixel vector in lieu of the direction of the pixel vector at the certain pixel before being corrected.

39. A recording medium as defined in claim 36 or 37 wherein the program further comprises the procedures for:

a) calculating a variance value in a predetermined region containing a certain pixel in a band-limited image of a certain frequency band, b) making a judgment as to whether the pixel vector at the certain pixel is to be corrected or may not be corrected, the judgment being made in accordance with the variance value, and c) performing an operation such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the procedure for obtaining the smoothed band-limited image signal is a procedure for performing the smoothing in accordance with the direction of the corrected pixel vector in lieu of the direction of the pixel vector at the certain pixel before being corrected.

40. A recording medium as defined in claim 36 or 37 wherein the program further comprises the procedures for:

separating a noise component and an edge component of each of smoothed band-limited images, which are represented by the smoothed band-limited image signals, in accordance with a magnitude of the pixel vector, and performing smoothing processing for the noise component and/or enhancement processing for the edge component on each of the smoothed band-limited image signals to obtain a processed band-limited image signal, and the procedure for obtaining the processed image signal is a procedure for obtaining the processed image signal in accordance with the thus obtained processed band-limited image signals in lieu of the smoothed band-limited image signals.

41. A recording medium as defined in claim 40 wherein the procedure for the separation is a procedure for separating the noise component and the edge component in accordance with the magnitude of the pixel vector at a certain pixel and the magnitude of a neighboring pixel vector at a pixel neighboring with the certain pixel.

42. A recording medium as defined in claim 40 wherein the program further comprises the procedure for correcting the pixel vector at a certain pixel in a band-limited image of a certain frequency band in accordance with the pixel vector at the pixel, which corresponds to the certain pixel, in a band-limited image of a frequency band lower than the certain frequency band, and the procedure for the separation is a procedure for separating the noise component and the edge component in accordance with the magnitude of the corrected pixel vector in lieu of the magnitude of the pixel vector at the certain pixel before being corrected.

43. A recording medium as defined in claim 40 wherein the program further comprises the procedures for:

a) calculating a variance value in a predetermined region containing a certain pixel in a band-limited image of a certain frequency band, b) making a judgment as to whether the pixel vector at the certain pixel is to be corrected or may not be corrected, the judgment being made in accordance with the variance value, and c) performing an operation such that, in cases where it has been judged that the pixel vector at the certain pixel is to be corrected, the correction means corrects the pixel vector at the certain pixel in accordance with the pixel vector at the pixel, which corresponds to the certain pixel, in a band-limited image of a frequency band lower than the certain frequency band, and the procedure for the separation is a procedure for separating the noise component and the edge component in accordance with the magnitude of the corrected pixel vector in lieu of the magnitude of the pixel vector at the certain pixel before being corrected.

44. A recording medium as defined in claim 36 or 37 wherein the procedure for forming the band-limited image signals is a procedure for performing multi-resolution transform processing on the original image signal to form the band-limited image signals, and the procedure for obtaining the processed image signal is a procedure for performing inverse multi-resolution transform processing on the smoothed band-limited image signals to obtain the processed image signal.

45. A recording medium as defined in claim 40 wherein the procedure for forming the band-limited image signals is a procedure for performing multi-resolution transform processing on the original image signal to form the band-limited image signals, and the procedure for obtaining the processed image signal is a procedure for performing inverse multi-resolution transform processing on the processed band-limited image signals to obtain the processed image signal.

* * * * *